(12) United States Patent
Kanai et al.

(10) Patent No.: US 9,524,189 B2
(45) Date of Patent: Dec. 20, 2016

(54) INFORMATION PROCESSING DEVICE, INFORMATION PROCESSING METHOD, AND COMPUTER PROGRAM PRODUCT

(71) Applicant: Kabushiki Kaisha Toshiba, Minato-ku (JP)

(72) Inventors: Jun Kanai, Inagi (JP); Hiroshi Isozaki, Kawasaki (JP); Mikio Hashimoto, Bunkyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/789,289

(22) Filed: Jul. 1, 2015

(65) Prior Publication Data

US 2016/0055030 A1    Feb. 25, 2016

(30) Foreign Application Priority Data

Aug. 20, 2014    (JP) .................... 2014-167885

(51) Int. Cl.
*G06F 3/00* (2006.01)
*G06F 9/48* (2006.01)
(Continued)

(52) U.S. Cl.
CPC ............ *G06F 9/485* (2013.01); *G06F 1/3215* (2013.01); *G06F 3/0611* (2013.01);
(Continued)

(58) Field of Classification Search
CPC ............... G06F 3/00; G06F 9/00; G06F 13/00
(Continued)

(56) References Cited

U.S. PATENT DOCUMENTS 5,991,797 A * 11/1999 Futral ................... G06F 9/54
    709/216
7,502,674 B2 * 3/2009 Okude ................ G06F 9/4843
    701/1
(Continued)

FOREIGN PATENT DOCUMENTS

JP    2010-211644    9/2010
JP    2012-194911    10/2012
(Continued)

*Primary Examiner* — Christopher Shin
(74) *Attorney, Agent, or Firm* — Oblon, McClelland, Maier & Neustadt, L.L.P.

(57) ABSTRACT

According to an embodiment, an information processing device is connectable to a peripheral device and includes a buffer, a first operating system, a second operating system, and a monitor. The monitor is configured to enable the first operating system or the second operating system to execute in a switching manner. The monitor includes a switching controller that, when the second operating system issues an access request to the peripheral device, saves a state of the second operating system and suspends its execution as well as restores a state of the first operating system and restarts its execution. The first operating system includes a request input-output controller that reads the access request from the buffer, that divides the read access request into instructions in receivable units for the peripheral device, and that issues each instruction. The first operating system includes an access controller that accesses the peripheral device according to the instructions.

15 Claims, 15 Drawing Sheets

(51) Int. Cl.
*G06F 3/06* (2006.01)
*G06F 13/40* (2006.01)
*G06F 9/44* (2006.01)
*G06F 9/46* (2006.01)
*G06F 1/32* (2006.01)
*G06F 9/455* (2006.01)
*G06F 9/00* (2006.01)

(52) U.S. Cl.
CPC .......... *G06F 3/0659* (2013.01); *G06F 3/0679* (2013.01); *G06F 9/4418* (2013.01); *G06F 9/45558* (2013.01); *G06F 9/461* (2013.01); *G06F 13/4022* (2013.01); *G06F 9/4411* (2013.01); *G06F 2009/45579* (2013.01); *G06F 2206/1014* (2013.01)

(58) Field of Classification Search
USPC .................. 710/6, 36, 52; 719/319; 718/108
See application file for complete search history.

(56) References Cited

U.S. PATENT DOCUMENTS

| | | | | |
|---|---|---|---|---|
| 2006/0085794 | A1* | 4/2006 | Yokoyama | G06F 9/45537 718/100 |
| 2009/0063845 | A1* | 3/2009 | Lin | G06F 1/3203 713/100 |
| 2010/0235669 | A1 | 9/2010 | Miyamuko | |
| 2011/0093691 | A1* | 4/2011 | Galicia | G06F 9/441 713/2 |
| 2012/0089992 | A1* | 4/2012 | Reeves | G06F 3/1431 719/318 |
| 2012/0239952 | A1 | 9/2012 | Nishiguchi et al. | |
| 2014/0115308 | A1* | 4/2014 | Li | G06F 9/4406 713/1 |
| 2014/0298026 | A1 | 10/2014 | Isozaki et al. | |
| 2014/0372651 | A1 | 12/2014 | Kanai et al. | |
| 2015/0220353 | A1* | 8/2015 | Rothman | G06F 9/542 719/319 |
| 2015/0317181 | A1* | 11/2015 | Chiang | G06F 9/46 713/1 |
| 2016/0156734 | A1* | 6/2016 | Lai | G06F 12/0813 709/213 |

FOREIGN PATENT DOCUMENTS

| | | |
|---|---|---|
| JP | 2012-212257 | 11/2012 |
| JP | 2014-191509 | 10/2014 |
| JP | 2015-001947 | 1/2015 |
| JP | 2015-60249 A | 3/2015 |
| JP | 2015-60569 A | 3/2015 |
| JP | 2015-64677 A | 4/2015 |

* cited by examiner

FIG.4

| DETAILS | VALUE |
|---|---|
| PERIPHERAL DEVICE TO BE ACCESSED | HDD1 |
| TYPE | WRITE |
| TOTAL SIZE | 1 MB |
| UNIQUE DATA OF PERIPHERAL DEVICE | STARTING SECTOR=xxxxx |
| INPUT-OUTPUT DATA | 00001111122222......xxxxx |

FIG.5

| DETAILS | VALUE |
|---|---|
| PERIPHERAL DEVICE TO BE ACCESSED | NIC1 |
| TYPE | READ |
| TOTAL SIZE | 100KB |
| UNIQUE DATA OF PERIPHERAL DEVICE | PROTOCOL=TCP/IP<br>DESTINATION IP ADDRESS=aaa.bbb.ccc.ddd<br>PORT=80<br>INITIALIZATION COMMAND=<br>"GET index.html HTTP/1.0\n\n" |
| INPUT-OUTPUT DATA | NULL |

| DETAILS | VALUE |
|---|---|
| SEQUENCE OF INSTRUCTIONS | do {<br>sleep(1 second);<br>data <- get_next_data();<br>output(soundcard, data);<br>} while(data != empty); |
| SIGNATURE | 01234.... |
| INPUT-OUTPUT DATA | 00001111122222......xxxxx |

9,524,189 B2

INFORMATION PROCESSING DEVICE, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2014-167885, filed on Aug. 20, 2014; the entire contents of which are incorporated herein by reference.

FIELD

Embodiments described herein relate generally to an information processing device, an information processing method, and a computer program product.

BACKGROUND

Typically, virtualization of an information processing device is a known technology. As a result of implementing the virtualization technology, a plurality of operating systems (OSs) can be executed in parallel in a single information processing device. Moreover, if switching between operating systems is done using the virtualization technique, then the access to a peripheral device for data input-output purposes can be offloaded from one operating system to another operating system.

Meanwhile, due to the limitation on the capacity of a buffer memory installed in a peripheral device, the access to a peripheral device is usually done in data units in the range of a few bytes to a few kilobytes. Hence, if the access for the purpose of inputting-outputting a relatively large volume of data is to be offloaded from one operating system to another operating system, switching between the operating systems needs to be done for each set of data equivalent to a few bytes to a few kilobytes. Therefore, if the access for the purpose of inputting-outputting a relatively large volume of data is to be offloaded, there is an increase in the frequency of switching between operating systems, thereby leading to an increase in the processing overhead.

BRIEF DESCRIPTION OF THE DRAWINGS

FIG. 4 is a diagram illustrating a first example of information written in a buffer according to the first embodiment;

FIG. 5 is a diagram illustrating a second example of information written into the buffer according to the first embodiment;

DETAILED DESCRIPTION

Figure 1:
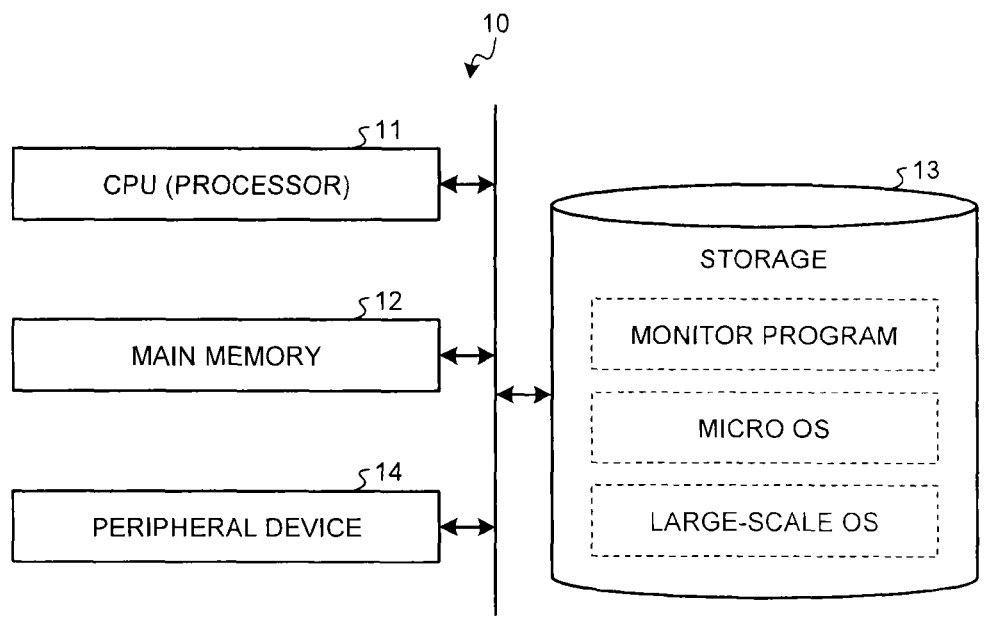
FIG. 1 is a diagram illustrating a hardware configuration of an information processing device according to a first embodiment.

According to an embodiment, an information processing device is connectable to a peripheral device and includes a buffer, a first operating system, a second operating system, and a monitor. The first operating system is configured to control the information processing device. The second operating system is configured to control the information processing device. The monitor is configured to enable either the first operating system or the second operating system to execute in a switching manner. The monitor includes a switching controller that, when the second operating system issues an access request with respect to the peripheral device, saves a state of the second operating system and suspends execution of the second operating system as well as restores a state of the first operating system and restarts execution of the first operating system. The first operating system includes a request input-output controller that reads, from the buffer, the access request written by the second operating system with respect to the peripheral device, that divides the read access request into instructions in receivable units for the peripheral device, and that issues each of the divided instructions. The first operating system includes an access controller that accesses the peripheral device according to the instructions issued by the request input-output controller.

Exemplary embodiments of an information processing device are described below in detail with reference to the accompanying drawings. In the information processing device according to the embodiments, in the case of switching between operating systems for the purpose of offloading the access to a peripheral device, it becomes possible to reduce the frequency of switching between the operating systems. As a result, in the information processing device according La the embodiments, the processing overhead can be reduced; the real-time property can be enhanced; and power saving can be achieved. The following explanation is given about a plurality of embodiments and modification examples in which the constituent elements having substantially identical functions are referred to by the same reference numerals in the drawings, and the relevant explanation is not repeated.

First Embodiment

FIG. 1 is a diagram illustrating a hardware configuration of an information processing device 10 according to a first embodiment. The information processing device 10 includes a central processing unit (CPU) 11 (processor), a main memory 12, a storage 13, and a peripheral device 14.

The CPU 11 executes a sequence of instructions written in a computer program that is stored in the main memory 12. Herein, the main memory 12 is used as a work area while the CPU 11 executes computer programs. The main memory 12 is also used to store computer programs called operating systems (OSs). An operating system is run by the CPU 11. Moreover, an operating system is a fundamental computer program for managing and controlling the devices installed in the information processing device 10 and enabling application programs to use hardware devices.

In the first embodiment, the main memory 12 is used to store a micro OS (a first operating system) and a large-scale OS (a second operating system). Besides, the main memory 12 is also used to store computer programs and data related to the micro OS and the large-scale OS.

The micro OS has a smaller line of code than the large-scale OS. As an example, the micro OS has about one-hundredth of the line of code of the large-scale OS. Accordingly, the power consumption in the case in which the CPU 11 executes the micro OS is generally less than the power consumption in the case in which the CPU 11 executes the large-scale OS. Moreover, as compared to the large-scale OS, the micro OS may have a smaller number of hardware devices for management and control.

The large-scale OS is, for example, a general-purpose OS such as Linux (registered trademark) or Windows (registered trademark). However, the large-scale OS is not limited to a general-purpose OS, and can be a dedicated OS used in a particular field.

The micro OS is, for example, a secure OS used in supplementing the vulnerability to the security of a general-purpose OS. However, the micro OS is not limited to a secure OS, and can be any other OS that is smaller than the large-scale OS.

Meanwhile, the main memory 12 is used to store a computer program called a monitor program, and to store computer programs and data related to the monitor program. The monitor program is executed by the CPU 11. Upon being executed by the CPU 11, the monitor program can provide virtual machines, which are formed by virtualizing the information processing device 10, to the operating systems.

As a result of executing the monitor program, the CPU 11 can run operating systems in parallel using a plurality of virtual machines. The monitor program switches between a plurality of virtual machines in a time-shared manner and executes them so as to run operating systems in parallel. In the first embodiment, the CPU 11 executes the monitor program to activate virtual machines, and switches to and runs either the micro OS or the large-scale OS.

The storage 13 is a nonvolatile memory device used in storing the monitoring program, the micro OS, and the large-scale OS. At the time of booting the information processing device 10, the CPU 11 reads the monitor program, the micro OS, and the large-scale OS from the storage 13; and stores them in the main memory 12. Then, the CPU 11 executes the monitor program, the micro OS, and the large-scale OS.

The peripheral device 14 is connectable via a bus or an interface, and functions as a part of the information processing device 10. For example, the peripheral device 14 is a device that can be controlled by the CPU 11; and examples of the peripheral device 14 include a storage device such as a hard disk drive, a communication device such as a network card, a signal generating device such as a measuring device, a sound input-output device, and an image input-output device.

Meanwhile, the information processing device 10 can include a plurality of peripheral devices 14. Moreover, the information processing device 10 can include other devices such as an input device and a display device.

Figure 2:
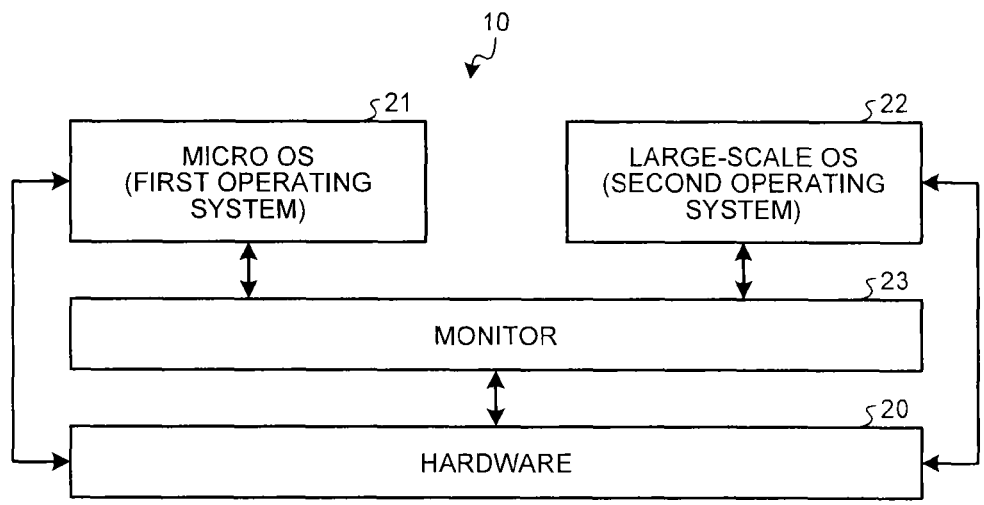
FIG. 2 is a diagram illustrating an overall functional configuration of the information processing device according to the first embodiment.

FIG. 2 is a diagram illustrating an overall functional configuration of the information processing device 10 according to the first embodiment. The information processing device 10 includes a hardware 20, a micro OS 21 (a first operating system), a large-scale OS 22 (a second operating system), and a monitor 23.

The hardware 20 includes the CPU 11, the main memory 12, the storage 13, and the peripheral device 14 illustrated in FIG. 1.

The micro OS 21 becomes functional when the micro OS program is executed by the CPU 11. The micro OS 21 manages and controls the hardware devices in the information processing device 10, and virtualizes the hardware devices and provides them to application programs.

The large-scale OS 22 becomes functional when the large-scale OS program is executed by the CPU 11. The large-scale OS 22 manages and controls the hardware devices in the information processing device 10, and virtualizes the hardware devices and provides them to application programs.

The monitor 23 becomes functional when the monitor program is executed by the CPU 11. The monitor 23 provides virtual machines to the micro OS 21 and the large-scale OS 22, and operates the micro OS 21 and the large-scale OS 22 in the virtual machines. Then, the monitor 23 switches to and runs either the micro OS 21 or the large-scale OS 22. Herein, the monitor 23 performs the switching in response to a call from the micro OS 21 or the large-scale OS 22, or in response to an interrupt from the peripheral device 14.

Figure 3:
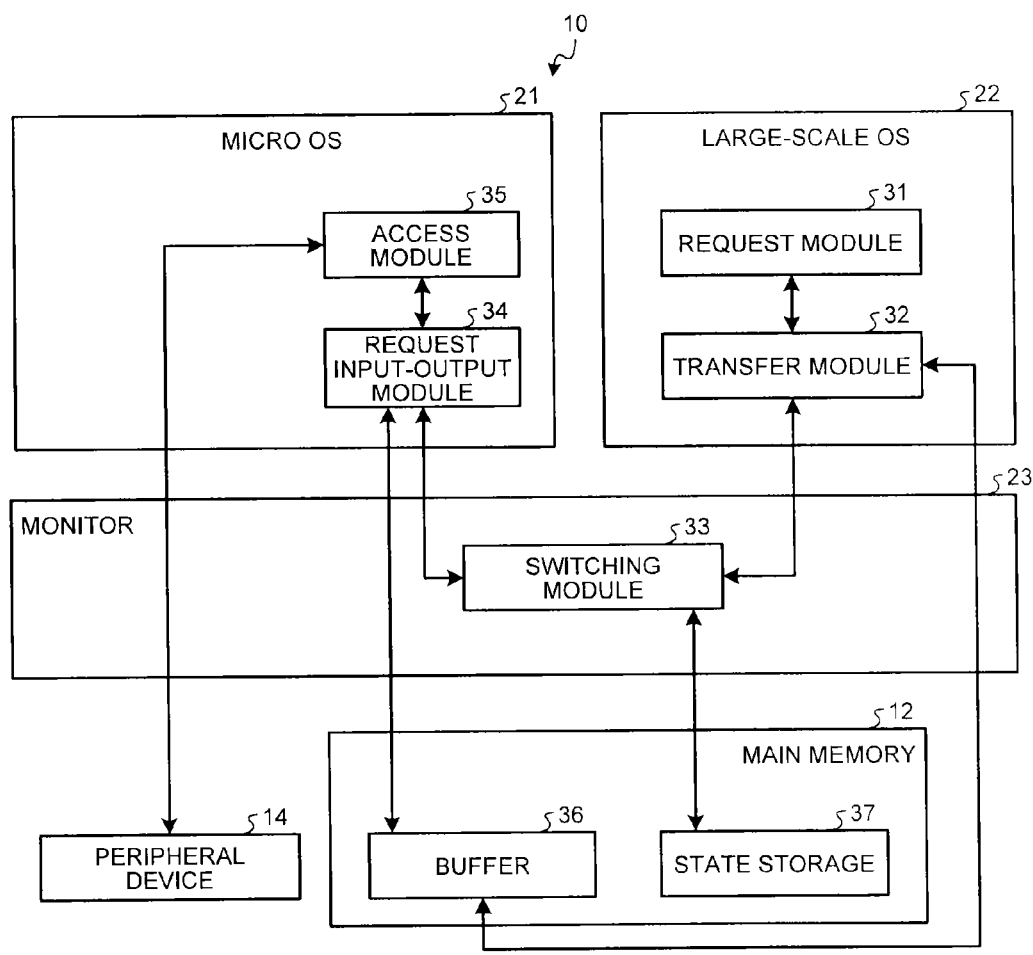
FIG. 3 is a diagram illustrating a functional configuration of the information processing device according to the first embodiment.

FIG. 3 is a diagram illustrating a functional configuration of the information processing device 10 according to the first embodiment. The following explanation is given about the detailed functions of the micro OS 21, the large-scale OS 22, and the monitor 23.

The large-scale OS 22 includes a request module 31 and a transfer module 32. The monitor 23 includes a switching module 33. The micro OS 21 includes a request input-output module 34 and an access module 35. The main memory 12 includes a buffer 36 and a state storage 37.

The request module 31 is called when the large-scale OS 22 accesses the peripheral device 14. For example, the request module 31 is called when the large-scale OS 22 outputs (writes) data to the peripheral device 14 or when the large-scale OS 22 receives input of (reads) data from the peripheral device 14. Then, the request module 31 calls the transfer module 32, and issues an access request with respect to the peripheral device 14 (for example, a request to output (write) data to the peripheral device 14 or a request to receive input of (read) data from the peripheral device 14).

The access request issued by the request module 31 need not be instructions in data units receivable by the peripheral device 14. For example, in the case of reading data from a hard disk drive; due to the limitation on the capacity of an input-output buffer, the information processing device 10 can read the data only in predetermined units (such as four kilobytes) per instruction. That is, in the case of reading data from a hard disk drive, the information processing device 10 cannot read data exceeding the limitation (for example, 100 megabytes) per instruction. However, the request module 31 can issue an access request having larger data units than the data units receivable by the peripheral device 14. For example, the request module 31 can issue an access request for receiving input of (reading) data equivalent to 100 megabytes from the sector number 1 of a hard disk drive.

The transfer module 32 is called by the request module 31 when the large-scale OS 22 issues an access request with respect to the peripheral device 14. When called by the request module 31, the transfer module 32 writes, into the buffer 36, the access request issued by the request module 31 with respect to the peripheral device 14.

As an example, access requests illustrated in FIGS. 4 and 5 are written into the buffer 36. That is, into the buffer 36, the following information is written: information enabling identification of the peripheral device 14 to be accessed, type, total size, unique data of the peripheral device 14, and input-output data.

In the table illustrated in FIG. 4, the information enabling identification of the peripheral device to be accessed represents the information enabling identification of the peripheral device 14 connected to the information processing device 10. The type represents whether the access to the peripheral device 14 is of an output (write) type or an input (read) type. The total size represents the size of the data to be output (to be written) or to be received as input (to be read).

In the table illustrated in FIG. 4, the unique data of a peripheral device represents, for example, the data required to access that peripheral device 14. For example, if the peripheral device 14 is a hard disk drive (HDD1), then the unique data of that peripheral device 14 represents the starting sector number. Alternatively, for example, if the peripheral device 14 is a network interface card (NTC1), then the unique data of that peripheral device 14 represents the communication protocol (such as TCP/IP), the destination IP address (such as aaa.bbb.ccc.ddd), the port number (such as "80"), and a message to be sent in the first place after the connection is established (for example, "initialization command=GET index.html HTTP/1.0\n\n").

When an access is of the output (write) type, the data to be output to the peripheral device 14 is stored as the input-output data. On the other hand, when an access is of the input (read) type, the data to be received as input from the peripheral device 14 is stored as the input-output data. Moreover, when an access is of the input (read) type, the transfer module 32 writes, into the buffer 36, an access request with empty input-output data.

Upon writing the access request into the buffer 36, the transfer module 32 calls the switching module 33 with the aim of switching the operating system.

The switching module 33 is called by the transfer module 32 when the large-scale OS 22 issues an access request with respect to the peripheral device 14. The switching module 33 saves a state of the large-scale OS 22 and suspends its execution, while restores the state of the micro OS 21 and restarts its execution.

More particularly, the switching module 33 obtains the context of the large-scale OS 22, and writes the obtained context in the state storage 37 (save of context). Then, the switching module 33 reads the context of the micro OS 21 from the state storage 37 and sets that context in the CPU 11 (restoration of context). Herein, the context points to information that represents the state of a device such as a register in the CPU 11, and that is shared between the micro OS 21 and the large-scale OS 22. When a plurality of operating systems is executed in parallel, the CPU 11 can switch between the operating systems by saving the in-execution context of one operation system and restoring the context of the other operation system available.

Upon restoring the state of the micro OS 21 and restarting its execution, the switching module 33 calls the request input-output module 34 for the purpose of making the micro OS 21 execute the access request which was issued by the large-scale OS 22 with respect to the peripheral device 14.

Thus, the request input-output module 34 is called by the switching module 33 when the large-scale OS 22 issues an access request with respect to the peripheral device 14. The request input-output module 34 reads, from the buffer 36, the access request written with respect to the peripheral device 14 by the large-scale OS 22. As an example, the request input-output module 34 reads the access request illustrated in FIG. 4 or FIG. 5.

Then, the request input-output module 34 divides the access request into instructions in receivable units for the peripheral device 14, and issues each divided instruction to the access module 35. More particularly, the request input-output module 34 divides the access request into instructions having the data size that can be input to or output from the peripheral device 14, and repeatedly issues the divided instructions until the data size that has already been input and output reaches the total size specified in the access request. For example, if an access request is issued for receiving input of (reading) data equivalent to 100 megabytes from the sector number 1 of a hard disk drive, the request input-output module 34 firstly issues an instruction to read data of 128 sectors from the sector number 1; then issues an instruction to read data of 128 sectors from the sector number 129; and so on. In this way, the request input-output module 34 divides the access request into a plurality of read instructions, and issues the read instructions in a repeated manner.

Then, the request input-output module 34 calls the access module 35 and sends the issued instructions in a sequential manner to the access module 35.

Thus, the access module 35 is called by the request input-output module 34. According to the instructions issued by the request input-output module 34, the access module 35 accesses the peripheral device 14. Subsequently, the access module 35 receives the accessing result from the peripheral device 14 and sends it to the request input-output module 34.

More particularly, when the request input-output module 34 issues an output instruction (a write instruction), the access module 35 receives, from the request input-output module 34, the data to be output and the unique data of the peripheral device 14. Then, the access module 35 accesses the specified peripheral device 14 according to the details given in the unique data, and outputs the data to the specified peripheral device 14. Meanwhile, when the request input-output module 34 issues an input instruction (a read instruction), the access module 35 receives the unique data of the peripheral device 14 from the request input-output module 34. Then, the access module 35 accesses the specified peripheral device 14 according to the details given in the unique data, receives input of the data from the specified peripheral device 14, and sends the received data as the accessing result to the request input-output module 34.

Thus, the request input-output module 34 receives, from the access module 35, the result of accessing the peripheral device 14 according to the issued instruction. Then, the request input-output module 34 writes the accessing result, which is received from the access module 35, into the buffer 36. For example, when an input instruction (a read instruction) is issued, the request input-output module 34 receives the data input from the peripheral device 14 and writes that data in an area into the buffer 36 meant for the input-output data of access requests.

When accessing the peripheral device 14 is completed, that is, when accessing the peripheral device 14 according to all divided instructions is completed; the request input-output module 34 calls the switching module 33.

Upon being called by the request input-output module 34 due to the completion of accessing the peripheral device 14, the switching module 33 saves the state of the micro OS 21 and suspends its execution, while restores the state of the large-scale OS 22 and restarts its execution. More particularly, the switching module 33 obtains the context of the micro OS 21, and writes the obtained context in the state storage 37. Then, the switching module 33 reads the context of the large-scale OS 22 from the state storage 37 and sets that context in the CPU 11. Then, the switching module 33 calls the transfer module 32.

Upon being called by the switching module 33 due to the completion of accessing the peripheral device 14, the transfer module 32 reads the accessing result from the buffer 36. For example, if the access request was issued for receiving input of (reading) data from the peripheral device 14, the transfer module 32 reads the input data from the buffer 36. Then, the transfer module 32 returns the accessing result to the request module 31.

Figure 6:
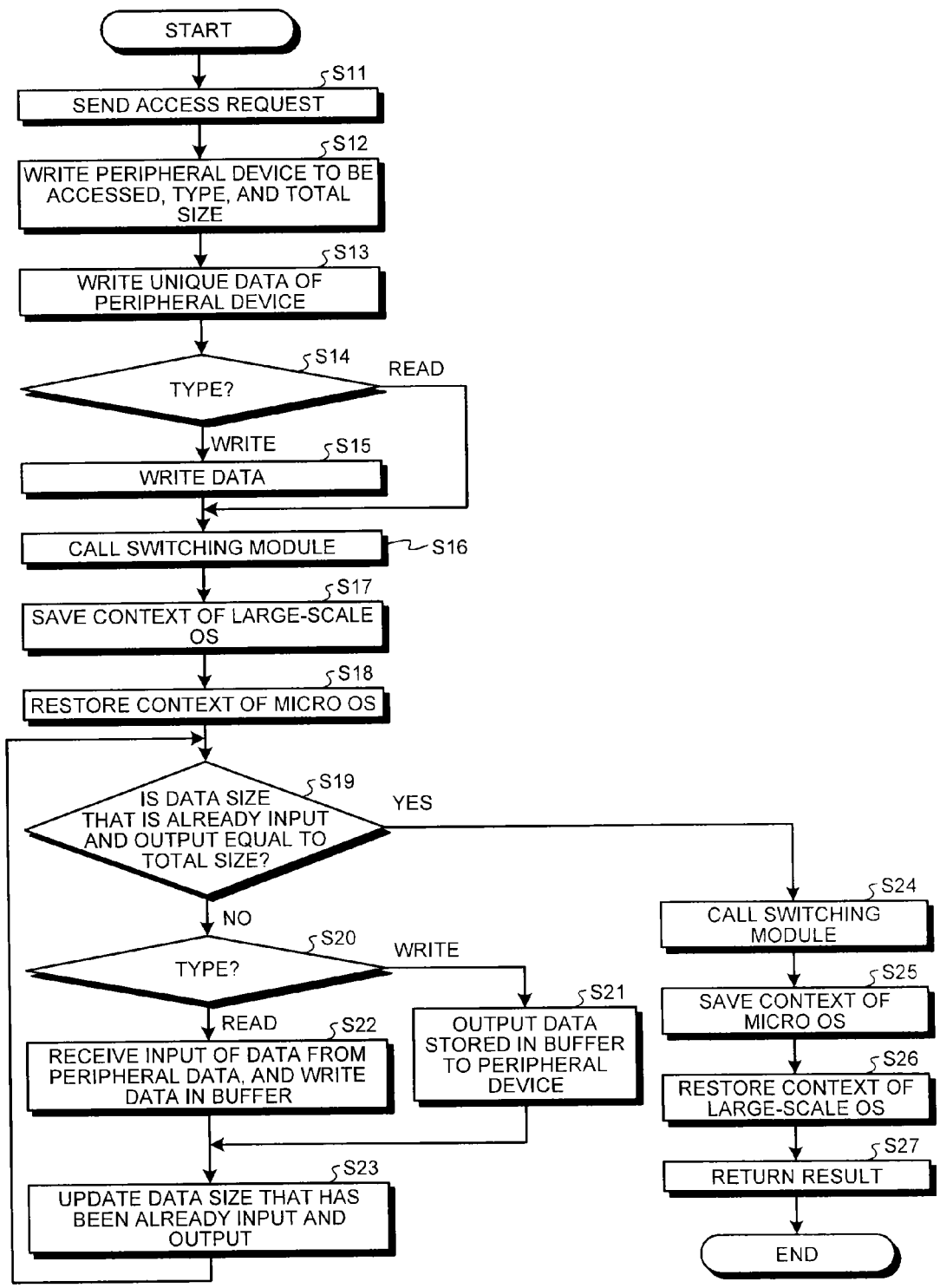
FIG. 6 is a diagram illustrating a flow of operations performed in the information processing device according to the first embodiment.

FIG. 6 is a diagram illustrating a flow of operations performed in the information processing device 10 according to the first embodiment. Thus, given below is the explanation of the flow of operations performed in the information processing device 10.

Firstly, the request module 31 calls the transfer module 32 and sends an access request to the transfer module 32 (Step S11). Then, the transfer module 32 writes, into the buffer 36, the value enabling identification of the peripheral device 14 to be accessed, the type, and the total size as specified in the access request (Step S12). Subsequently, the transfer module 32 writes, into the buffer 36, the unique data of the peripheral device 14 as specified in the access request (Step S13).

Then, the transfer module 32 determines whether the access to the peripheral device 14 is of the output (write) type or the input (read) type (Step S14). If the access is of the output (write) type, then the transfer module 32 writes data into the buffer 36 (Step S15). Then, the system control proceeds to Step S16. On the other hand, if the access is of the input (read) access, then the system control directly proceeds to Step S16. Subsequently, the transfer module 32 calls the switching module 33 (Step S16).

Then, the switching module 33 obtains the context of the large-scale OS 22 and writes it in the state storage 37. As a result, the switching module 33 can save the context of the large-scale OS 22, and suspend the execution of the large-scale OS 22 (Step S17).

Subsequently, the switching module 33 reads the context of the micro OS 21 from the state storage 37, and restores the context. As a result, the switching module 33 can restart the execution of the micro OS 21 (Step S18). Then, the switching module 33 calls the request input-output module 34.

Subsequently, the request input-output module 34 determines whether or not the data size that has already been input and output is identical to the total size written into the buffer 36 (Step S19). If the data size that has already been input and output is identical to the total size (Yes at Step S19), the system control proceeds to Step S24. However, if the data size that has already been input and output is not identical to the total size (No at Step S19), the system control proceeds to Step S20.

Subsequently, the request input-output module 34 determines whether or not the access is of an output (write) type or an input (read) type (Step S20). If the access is of an output (write) type, then the request input-output module 34 issues output instructions (write instructions), which are formed by dividing the access request, to the access module 35 and outputs the data that is stored in the buffer 36 to the peripheral device 14 (Step S21). However, if the access is of an input (read) type, then the request input-output module 34 issues input instructions (read instructions), which are formed by dividing the access request, to the access module 35 and writes, into the buffer 36, the data received by the access module 35 from the peripheral device 14 (Step S22). Once the request input-output module 34 issues the divided instructions, the system control proceeds to Step S23.

Then, the request input-output module 34 updates the data size of the data that has already been input and output (Step S23). After the operation at Step S23 is completed, the system control returns to Step S19. The request input-output module 34 repeatedly performs the operations from Steps S19 to S23 until the data size that has already been input and output reaches the total size. For example, if the total size is one megabyte (1024 kilobytes) and if the input-output buffer of the peripheral device 14 has the capacity of one kilobyte, then the request input-output module 34 performs the operations from Steps S19 to S23 in a repeated manner for 1024 times.

When the data size that has already been input and output become identical to the total size (Yes at Step S19), it implies that accessing the peripheral device 14 according to the access request is completed. Hence, the request input-output module 34 calls the switching module 33 (Step S24). Then, the switching module 33 obtains the context of the micro OS 21 and writes it in the state storage 37. As a result, the switching module 33 can save the context of the micro OS 21, and suspend the execution of the micro OS 21 (Step S25).

Subsequently, the switching module 33 reads the context of the large-scale OS 22 from the state storage 37 and retores the context. As a result, the switching module 33 can restart the execution of the large-scale OS 22 (Step S26). Then, the switching module 33 calls the transfer module 32.

Subsequently, the transfer module 32 returns the accessing result to the request module 31 (Step S27). Meanwhile, when the access request is of an input (read) type, the transfer module 32 reads the input data from the buffer 36 and sends it to the request module 31. When the operation at Step S27 is completed, it marks the end of the flow of operations performed in the information processing device 10.

In this way, in the information processing device 10 according to the first embodiment, if the access request issued by the large-scale OS 22 with respect to the peripheral device 14 is to be offloaded to the micro OS 21, the micro OS 21 divides the access request and accesses the peripheral device 14. As a result, in the information processing device 10 according to the first embodiment, the overhead can be eliminated by reducing the frequency of switching between the operating systems, and the real-time property can be enhanced.

For example, in the case of outputting one megabyte (1024 kilobytes) of data to the outside via a network, if the data input-output buffer of a network interface card has the capacity of one kilobyte, then the information processing device 10 divides the data into 1024 sets of data and then accesses the network interface card. However, the information processing device 10 writes an access request of one megabyte without modification into the buffer 36. In such a case, the operating systems need not be switched to and from for 2048 times, and writing can be completed by only two times of to-and-fro switching of the operating systems.

Modification Example of First Embodiment

Figure 7:
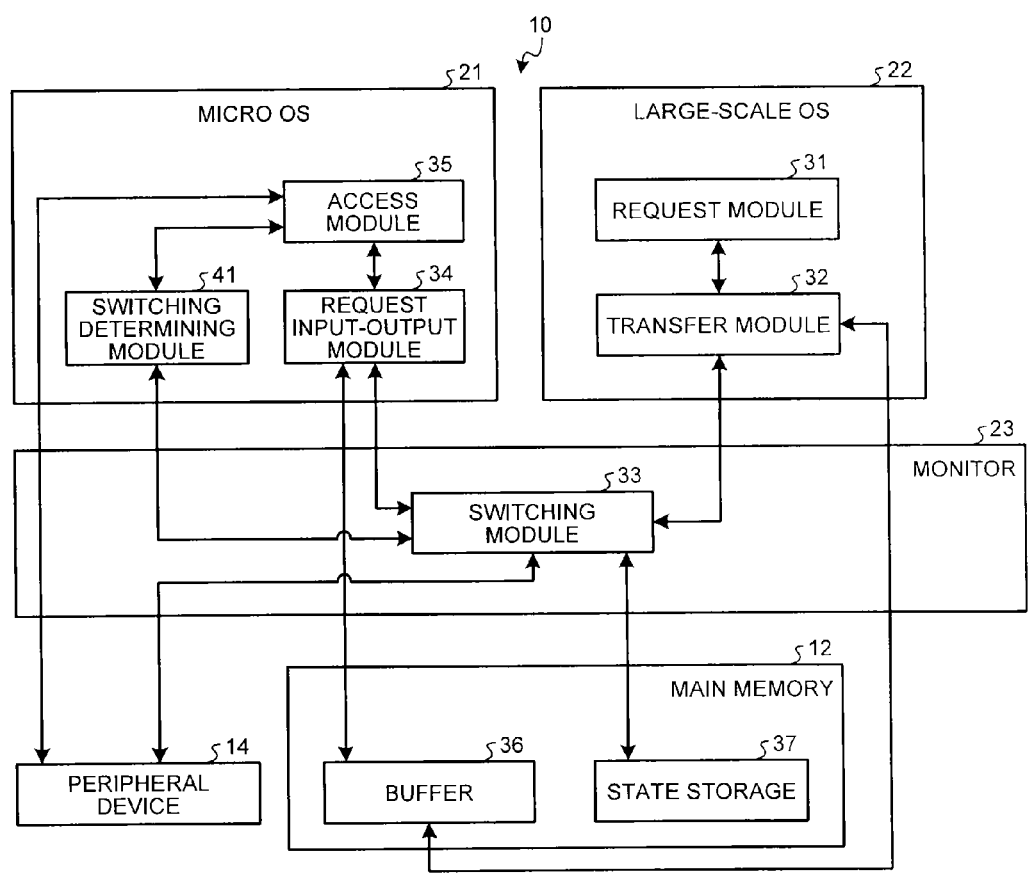
FIG. 7 is a diagram illustrating a functional configuration of the information processing device according to a modification example of the first embodiment.

FIG. 7 is a diagram illustrating a functional configuration of the information processing device 10 according to a modification example of the first embodiment. In the information processing device 10 according to the modification example of the first embodiment, while the operations of the peripheral device 14 are underway, the execution of the micro OS 21 can be suspended and the large-scale OS 22 can be made functional. Herein, the information processing device 10 according to the modification example has a substantially identical functional configuration to the functional configuration illustrated in FIG. 3. Thus, the following explanation is given about the differences with the functional configuration illustrated in FIG. 3.

According to the modification example, the micro OS 21 further includes a switching determining module 41, which is called by the access module 35. More particularly, the switching determining module 41 is called by the access module 35 after the peripheral device 14 becomes operational as a result of being accessed by the access module 35.

The switching determining module 41 determines whether or not to suspend the execution of the micro OS 21 and to restart the execution of the large-scale OS 22 while the operations of the peripheral device 14 are underway. As an example, if the estimated operating period of the peripheral device 14 is equal to or greater than a predetermined period of time, then the switching determining module 41 determines to suspend the execution of the micro OS 21 and to restart the execution of the large-scale OS 22. Moreover, as an example, when called by the access module 35, that is, when the peripheral device 14 becomes operational; the switching determining module 41 can determine to suspend the execution of the micro OS 21 and to restart the execution of the large-scale OS 22.

If it is determined to suspend the execution of the micro OS 21 and to restart the execution of the large-scale OS 22, then the switching determining module 41 calls the switching module 33. However, if it is not determined to suspend the execution of the micro OS 21 and to restart the execution of the large-scale OS 22, then the switching determining module 41 does not particularly perform any operations and returns the control back to the access module 35.

After the peripheral device 14 starts the operations in response to being accessed by the access module 35, even if execution of the micro OS 21 is suspended, the peripheral device 14 continues with the operations. After completing the operations, the peripheral device 14 issues an interrupt to the switching module 33 as a notification of completion of the operations.

When the switching determining module 41 calls the switching module 33 after determining to suspend the execution of the micro OS 21 and to restart the execution of the large-scale OS 22, the switching module 33 restores the state of the micro OS 21 and suspends its execution, while restores the state of the large-scale OS 22 and restarts its execution. Then, the switching module 33 calls the transfer module 32. When the switching module 33 calls the transfer module 32 after the switching determining module 41 has determined to suspend the execution of the micro OS 21 and to restart the execution of the large-scale OS 22, the transfer module 32 changes the task of issuing the access request to some other task. As a result, while the operations of the peripheral device 14 are underway, the large-scale OS 22 can perform some other operations which are different than the operation of issuing the access request.

Meanwhile, when an interrupt is issued to the switching module 33 as a notification of completion of the operations, the switching module 33 determines whether the peripheral device 14 was accessed by the micro OS 21 or by the large-scale OS 22. If the peripheral device 14 was accessed by the large-scale OS 22, then the switching module 33 issues an interrupt to the large-scale OS 22 as a notification of completion of the operations.

However, if the peripheral device 14 was accessed by the micro OS 21, that is, if the peripheral device 14 has completed the operations started in response to the access by the micro OS 21; then the switching module 33 restores the state of the large-scale OS 22 and suspends its execution, while restores the state of the micro OS 21 and restarts its execution. Then, the switching module 33 calls the switching determining module 41.

Upon being called by the switching module 33, the switching determining module 41 returns the control to the access module 35. Upon getting back the control from the switching determining module 41, the access module 35 continues with accessing the peripheral device 14. As a result, the access module 35 can receive the accessing result from the peripheral device 14. Then, if the request input-output module 34 issues the next instruction; the access module 35 accesses the peripheral device 14, makes the peripheral device 14 start the operations, and again calls the switching determining module 41.

Figure 8:
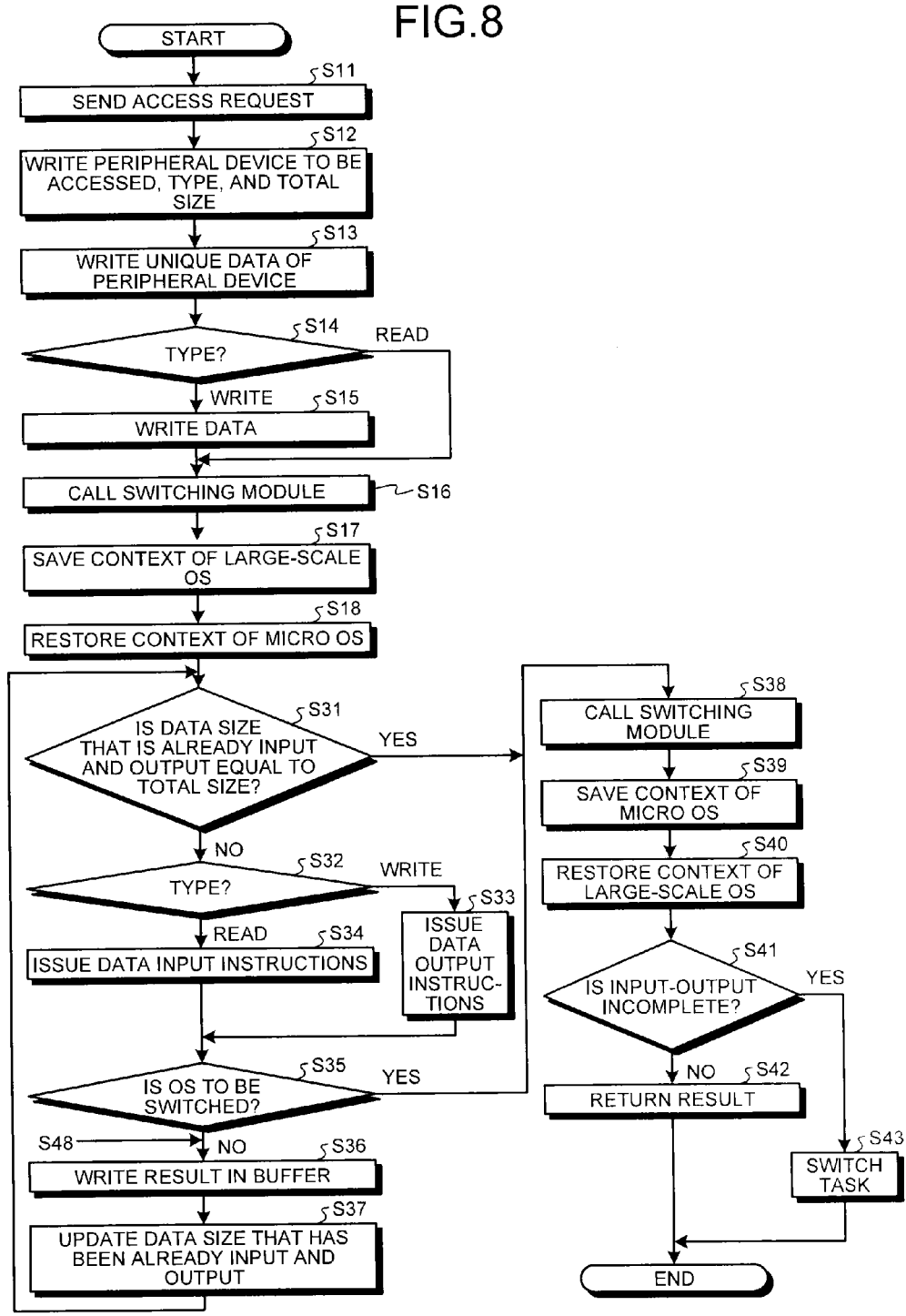
FIG. 8 is a diagram illustrating a flow of operations performed in the information processing device according to the modification example of the first embodiment.

FIG. 8 is a diagram illustrating a flow of operations performed in the information processing device 10 according to the modification example of the first embodiment. In the information processing device 10 according to the modification example, the operations from Steps S11 to S18 are identical to the flow of operations illustrated in FIG. 6. Thus, in the modification example, the flow of operations is explained from Step S18 onward.

After the operation at Step S18 is completed, the switching module 33 calls the request input-output module 34. Then, the system control proceeds to Step S31. The request input-output module 34 determines whether or not the data size that has already been input and output is identical to the total size written into the buffer 36 (Step S31). If the data size that has already been input and output is identical to the total size (Yes at Step S31), the system control proceeds to Step S38. However, if the data size that has already been input and output is not identical to the total size (No at Step S31), the system control proceeds to Step S32.

At Step S32, the request input-output module 34 determines whether or not the access is of an output (write) type or an input (read) type. If the access is of an output (write) type, then the request input-output module 34 issues output instructions (write instructions), which are formed by dividing the access request, to the access module 35 and outputs the data that is stored in the buffer 36 to the peripheral device 14 (Step S33). However, if the type of access is an input (read) access, then the request input-output module 34 issues input instructions (read instructions), which are formed by dividing the access request, to the access module 35 (Step S34). The access module 35 accesses the peripheral device 14 according to the instructions issued by the request input-output module 31, makes the peripheral device 14 start the operations, and calls the switching determining module 41. Then, the system control proceeds to Step S35.

Subsequently, the switching determining module 41 determines whether or not to suspend the execution of the micro OS 21 and to restart the execution of the large-scale OS 22 while the operations of the peripheral device 14 are underway (Step S35). If the switching determining module 41 determines to suspend the execution of the micro OS 21 and to restart the execution of the large-scale OS 22 while the operations of the peripheral device 14 are underway (Yes at Step S35), then the system control proceeds to Step S38.

However, if the switching determining module 41 determines not to suspend the execution of the micro OS 21 and not to restart the execution of the large-scale OS 22 while the operations of the peripheral device 14 are underway (No at Step S35), then the system control proceeds to Step S36.

The request input-output module 34 receives the accessing result of the instructions issued at Step S34 or Step S35, and writes the accessing result into the buffer 36 (Step S36). Meanwhile, when an instruction for receiving input of data from the peripheral device 14 (i.e., a read instruction) is issued, the request input-output module 34 writes the data obtained from the peripheral device 14 into the buffer 36.

Then, the request input-output module 34 updates the data size of the data that has already been input and output (Step S37). After the operation at Step S37 is completed, the system control returns to Step S31. The request input-output module 34 performs the operations from Steps S31 to S37 in a repeated manner until the data size that has already been input and output is identical to the total size.

Meanwhile, when it is determined to suspend the execution of the micro OS 21 and to restart the execution of the large-scale OS 22 while the operations of the peripheral device 14 are underway (Yes at Step S35) or when the data size that has already been input and output is identical to the total size (Yes at Step S31), the request input-output module 34 calls the switching module 33 (Step S38). Then, the switching module 33 obtains the context of the micro OS 21 and writes it in the state storage 37. As a result, the switching module 33 can save the context of the micro OS 21, and suspend the execution of the micro OS 21 (Step S39).

Subsequently, the switching module 33 reads the context of the large-scale OS 22 from the state storage 37, and restores the context. As a result, the switching module 33 can restart the execution of the large-scale OS 22 (Step S40). Then, the switching module 33 calls the transfer module 32.

Subsequently, the transfer module 32 determines whether or not the operations of the peripheral device 14 in response to the issued access request are incomplete (Step S41). If the operations of the peripheral device 14 in response to the issued access request are not incomplete (No at Step S41), the system control proceeds to Step S42. Then, the transfer module 32 returns the accessing result to the request module 31 (Step S42).

However, if the operations of the peripheral device 14 in response to the issued access request are incomplete (Yes at Step S41), the system control proceeds to Step S43. Then, the transfer module 32 switches to some other task (Step S43). As a result, in the information processing device 10, while the operations of the peripheral device 14 are underway, the large-scale OS 22 can perform some other operations.

When the operation at Step S42 or Step S43 is completed, it marks the end of the flow of operation performed in the information processing device 10.

Figure 9:
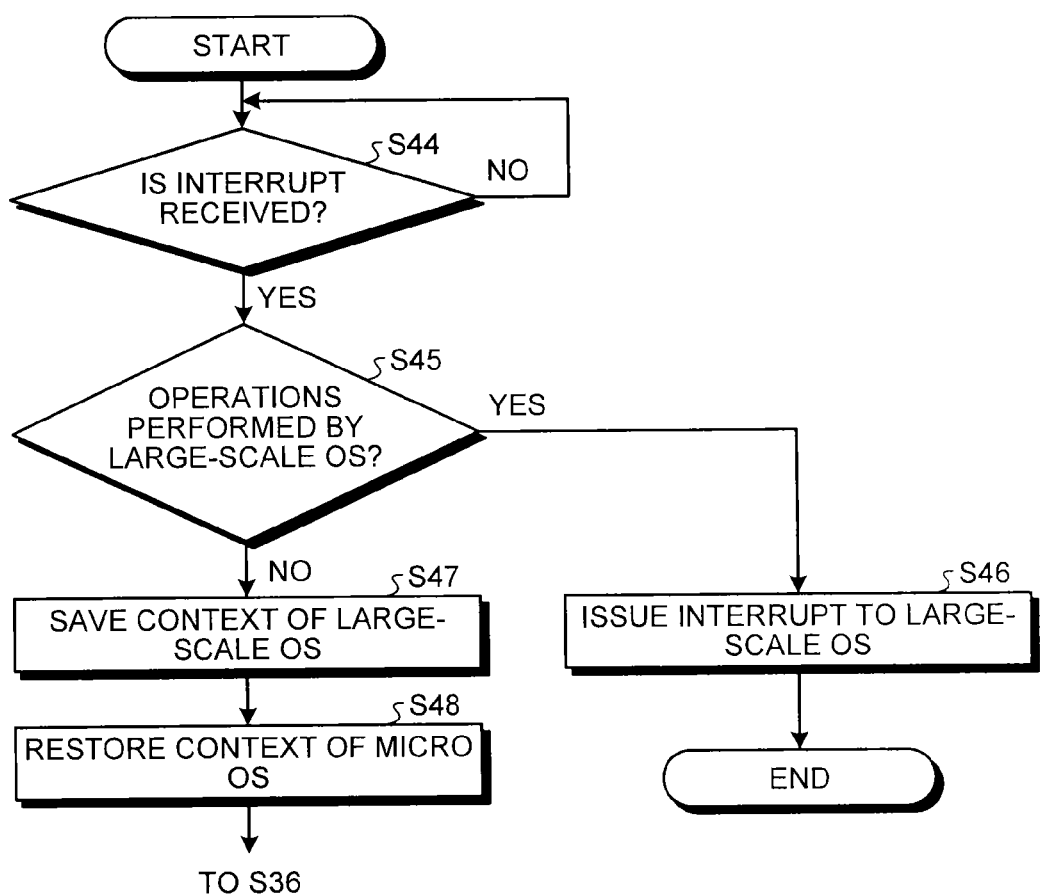
FIG. 9 is a diagram illustrating a flow of operations performed by a switching module according to the modification example of the first embodiment.

FIG. 9 is a diagram illustrating a flow of operations performed by the switching module 33 according to the modification example of the first embodiment. In the modification example, alongside the operations performed according to the flow illustrated in FIG. 8, the switching module 33 performs operations according to the flow illustrated in FIG. 9.

Firstly, until an interrupt indicating the completion of operations is received from the peripheral device 14, the switching module 33 refrains from performing operations (Step S44). When an interrupt indicating the completion of operations is received from the peripheral device 14 (Yes at Step S44), the system control proceeds to Step S45.

The switching module 33 determines whether or not the peripheral device 14, which issued an interrupt, was accessed by the micro OS 21 or by the large-scale OS 22 (Step S45. If the peripheral device 14 was accessed by the large-scale OS 22 (Yes at Step S45), the system control proceeds to Step S46. Then, the switching module 33 issues an interrupt to the large-scale OS 22 as a notification of completion of the operations (Step S46). It marks the end of the flow of operations.

However, if the peripheral device 14 was accessed by the micro OS 21 (No at Step S45), the system control proceeds to Step S47. Then, the switching module 33 obtains the context of the large-scale OS 22 and writes it in the state storage 37. As a result, the switching module 33 can save the context of the large-scale OS 22, and suspend the execution of the large-scale OS 22 (Step S47).

Subsequently, the switching module 33 reads the context of the micro OS 21 from the state storage 37, and restores the context. As a result, the switching module 33 can restart the execution of the micro OS 21 (Step S48).

Then, the switching module 33 calls the request input-output module 34. Upon being called by the switching module 33, the request input-output module 34 performs operations from Step S36 onward illustrated in FIG. 8. As a result, the request input-output module 34 returns to the loop of operations from Steps S31 to S37, and can repeatedly issue instructions according to the access request.

Thus, in the information processing device 10 according to the modification example, while the operations of the peripheral device 14 are underway, the execution of the micro OS 21 can be suspended and the large-scale OS 22 can be made functional. As a result, in the information processing device 10, it becomes possible to shorten the stoppage period of the functions of the large-scale OS 22 attributed to offloading, and to access the peripheral device 14 with more efficiency.

Second Embodiment

Figure 10:
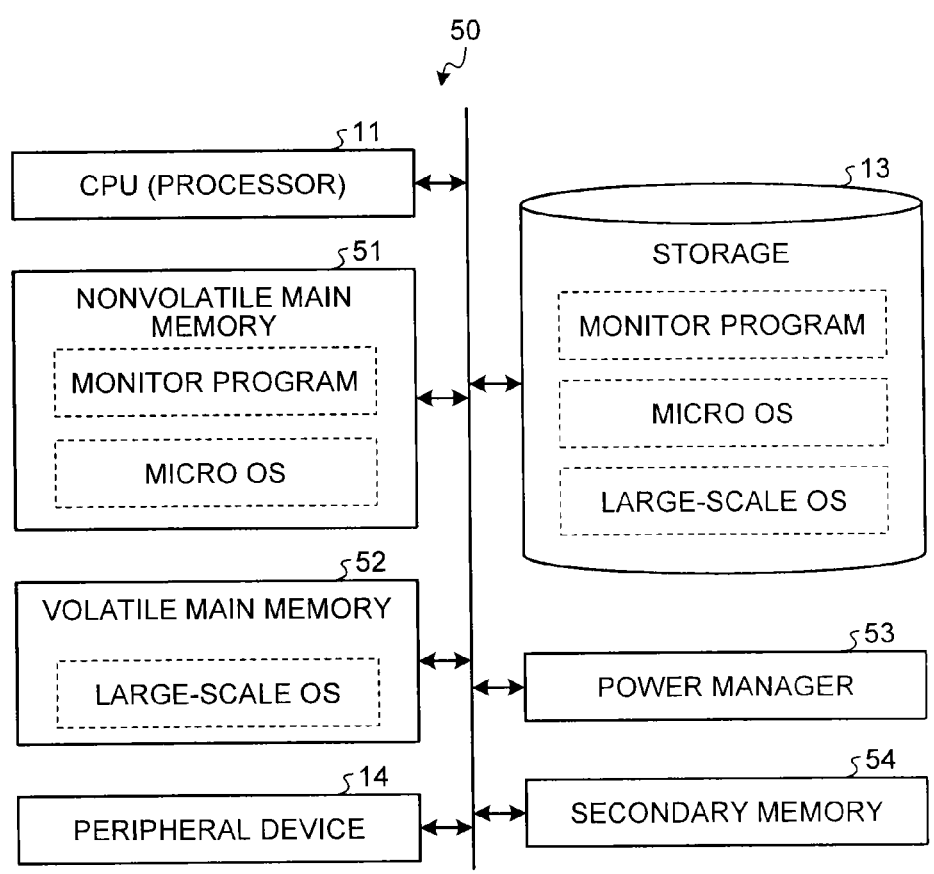
FIG. 10 is a diagram illustrating a hardware configuration of an information processing device according to a second embodiment.

FIG. 10 is a diagram illustrating a hardware configuration of an information processing device 50 according to a second embodiment. In the information processing device 50 according to the second embodiment, while the execution of the large-scale OS 22 is suspended, the hardware devices related to the large-scale OS 22 can be powered OFF so as to save electrical power.

The information processing device 50 according to the second embodiment includes a nonvolatile main memory 51, a volatile main memory 52, a power manager 53, and a secondary memory 54 in place of the main memory 12 of the information processing device 10 illustrated in FIG. 1 according to the first embodiment.

The nonvolatile main memory 51 represents a memory in which data remains stored even after the supply of electrical power is disconnected. The nonvolatile main memory 51 is used to store a monitor program, a micro OS, and computer programs and data related to the monitor program and the micro OS. Moreover, the nonvolatile main memory 51 is used as a work area while the CPU 11 executes the monitor program and the micro OS. As an example, the nonvolatile main memory 51 is a magnetoresistive random access memory (MRAM).

The volatile main memory 52 represents a memory that loses the stored data when the supply of electrical power is disconnected. The volatile main memory 52 is used to store a large-scale OS and computer programs and data related to the large-scale OS. Moreover, the volatile main memory 52 is used as a work area while the CPU 11 executes the large-scale OS. As an example, the volatile main memory 52 is a dynamic random access memory (DRAM).

The power manager 53 controls activation and disconnection of the supply of electrical power to the hardware devices installed in the information processing device 50. More particularly, under the control of the CPU 11, the power manager 53 controls activation and disconnection of the supply of electrical power to the volatile main memory 52 as well as controls activation and disconnection of the supply of electrical power to the peripheral device 14.

The secondary memory 54 represents a memory in which data remains stored even after the supply of electrical power is disconnected. For example, the secondary memory 54 is a hard disk drive or a flash memory. Moreover, the secondary memory 54 is connected to the CPU 11 via a bus or an interface.

Figure 11:
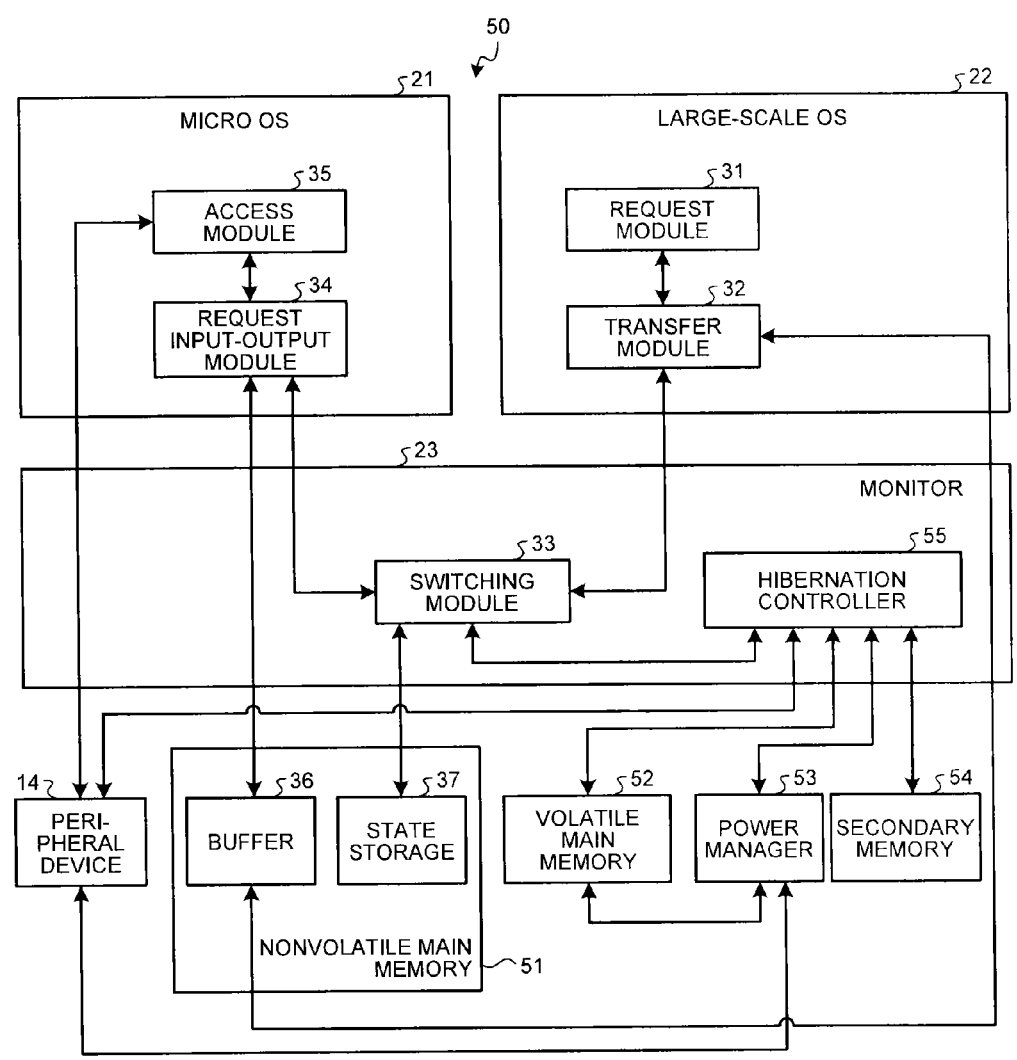
FIG. 11 is a diagram illustrating an overall functional configuration of the information processing device according to the second embodiment.

FIG. 11 is a diagram illustrating an overall functional configuration of the information processing device 50 according to the second embodiment. Herein, the information processing device 50 according to the second embodiment has a substantially identical functional configuration to the functional configuration illustrated in FIG. 3. Thus, the following explanation is given about the differences with the functional configuration illustrated in FIG. 3.

According to the second embodiment, the nonvolatile main memory 51 includes the buffer 36 and the state storage 37. Moreover, according to the second embodiment, the monitor 23 further includes a hibernation controller 55.

The switching module 33 calls the hibernation controller 55 in the case of suspending the execution of the large-scale OS 22 and making the micro OS 21 functional. Moreover, the switching module 33 calls the hibernation controller 55 also in the case of suspending the execution of the micro OS 21 and making the large-scale OS 22 functional.

Thus, in the case of suspending the execution of the large-scale OS 22 and making the micro OS 21 functional, the hibernation controller 55 is called by the switching module 33. In that case, the hibernation controller 55 performs operations as follows.

The hibernation controller 55 obtains a copy of the computer programs and the data stored in the volatile main memory 52 for the purpose of making the CPU 11 function as the large-scale OS 22, and writes the computer programs and the data in the secondary memory 54. Then, the hibernation controller 55 issues an instruction to the power manager 53 to disconnect the supply of electrical power to the volatile main memory 52. Moreover, the hibernation controller 55 reads the states of the peripheral devices 14 that are used by the large-scale OS 22 but are not used by the micro OS 21, and writes the states in the secondary memory 54. Then, the hibernation controller 55 issues an instruction to the power manager 53 to disconnect the supply of electrical power to the peripheral devices 14 that are used by the large-scale OS 22 but are not used by the micro OS 21.

Furthermore, in the case of suspending the execution of the micro OS 21 and making the large-scale OS 22 functional, the hibernation controller 55 is called by the switching module 33. In that case, the hibernation controller 55 performs operations as follows.

The hibernation controller 55 activates the supply of electrical power to the volatile main memory 52. Then, the hibernation controller 55 reads, from the secondary memory 54, the computer programs and the data stored in the volatile main memory 52 for the purpose of making the CPU 11 function as the large-scale OS 22, and writes the computer programs and the data in the volatile main memory 52. Moreover, the hibernation controller 55 activates the supply of electrical power to the peripheral devices 14 that are used by the large-scale OS 22 but are not used by the micro OS 21. Then, the hibernation controller 55 sets those peripheral devices 14 to the state of being stored in the secondary memory 54.

Figure 12:
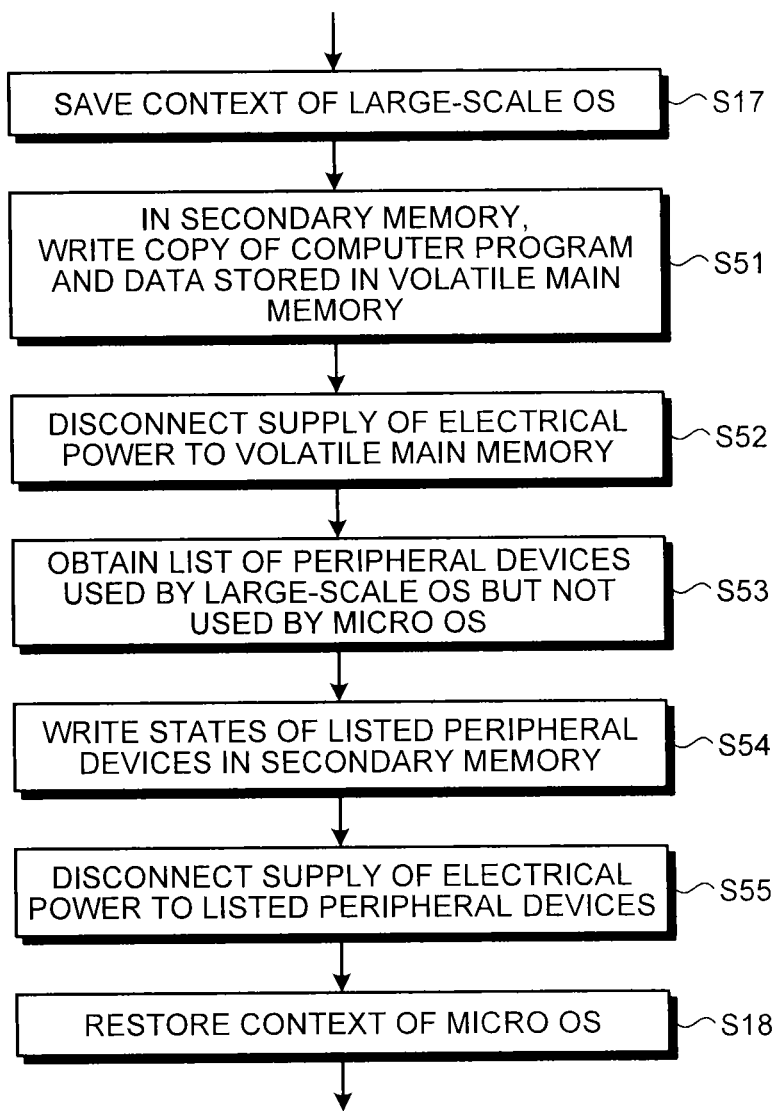
FIG. 12 is a diagram illustrating a first flow of operations performed by a hibernation controller.
Figure 13:
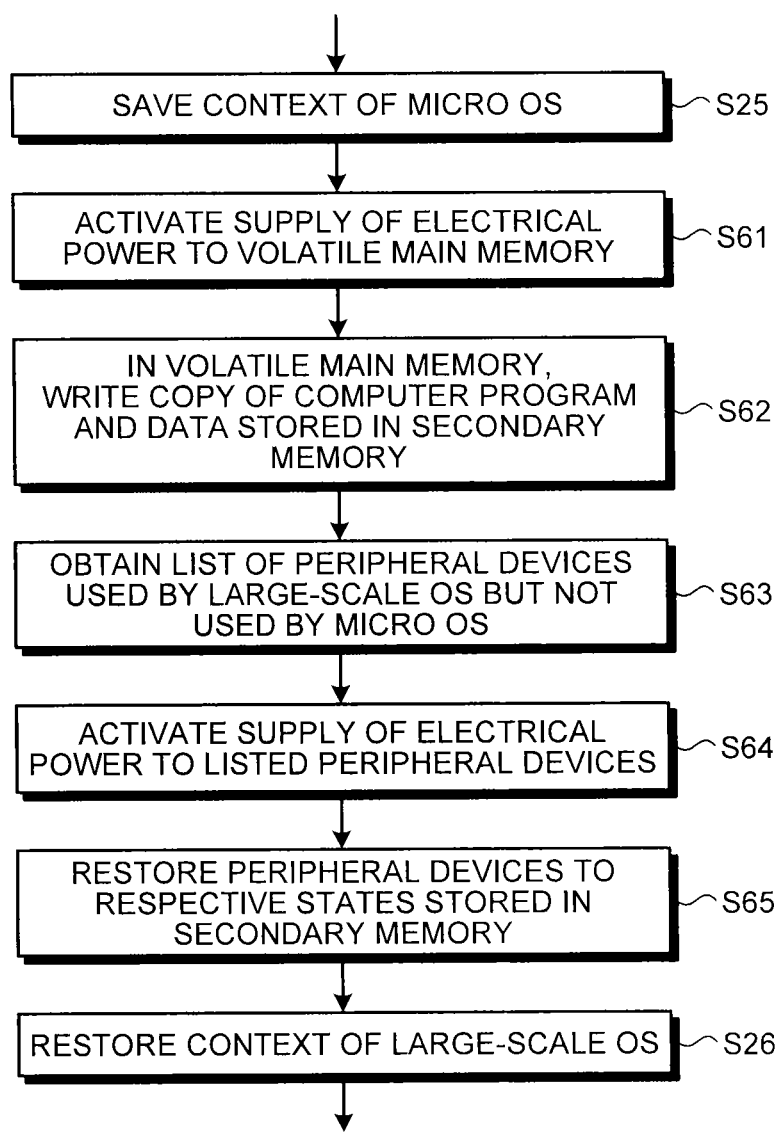
FIG. 13 is a diagram illustrating a second flow of operations performed by the hibernation controller.

FIG. 12 is a diagram illustrating a flow of operations performed in between Steps S17 and S18 in the information processing device 50 according to the second embodiment. FIG. 13 is a diagram illustrating a flow of operations performed in between Steps S25 and S26 in the information processing device 50 according to the second embodiment.

In the information processing device 50 according to the second embodiment, in addition to the operations performed from Steps S11 to S27 illustrated in FIG. 6, the operations from Steps S51 to S55 illustrated in FIG. 12 are performed in between Steps S17 and S18. Moreover, in the information processing device 50 according to the second embodiment, in addition to the operations performed from Steps S11 to S27 illustrated in FIG. 6, the operations from Steps S61 to S65 illustrated in FIG. 13 are performed in between Steps S25 and S26.

After saving the context of the large-scale OS 22 at Step S17 illustrated in FIG. 12, the switching module 33 calls the hibernation controller 55. Then, the hibernation controller 55 writes the computer programs and the data, which are stored in the volatile main memory 52, in the secondary memory 54 (Step S51). Subsequently, the hibernation controller 55 issues a power disconnection instruction to the power manager 53 so as to disconnect the supply of electrical power to the volatile main memory 52 (Step S52).

Then, the hibernation controller 55 obtains a list of peripheral devices 14 that are used by the large-scale OS 22 but are not used by the micro OS 21 (Step S53). Subsequently, the hibernation controller 55 reads the state of each of the listed peripheral devices 14 and writes that state in the secondary memory 54 (Step S54). Subsequently, the hibernation controller 55 issues a power disconnection instruction to the power manager 53 so as to disconnect the supply of electrical power to the listed peripheral devices 14 (Step S55). Then, at Step S18, the switching module 33 restores the context of the micro OS 21.

At Step S25 illustrated in FIG. 13, after saving the context of the large-scale OS 22 at Step S17 illustrated in FIG. 12, the switching module 33 calls the hibernation controller 55. Then, the hibernation controller 55 issues a power activation instruction to the power manager 53 so as to activate the supply of electrical power to the volatile main memory 52 (Step S61). Subsequently, the hibernation controller 55 reads the computer programs and the data from the secondary memory 54, and writes them in the volatile main memory 52 (Step S62).

Then, the hibernation controller 55 obtains a list of peripheral devices 14 that are used by the large-scale OS 22 but are not used by the micro OS 21 (Step S63). Subsequently, the hibernation controller 55 issues a power activation instruction to the power manager 53 so as to activate the supply of electrical power to the listed peripheral devices 14 (Step S64). Then, the hibernation controller 55 restores the listed peripheral devices 14 to the respective states stored in the secondary memory 54 (Step S65). Subsequently, at Step S26, the switching module 33 restores the context of the large-scale OS 22.

Generally, the data input-output with respect to the peripheral devices 14 is performed for long periods of time. Therefore, if large volumes of data input-output accesses are offloaded to the micro OS 21, then the large-scale OS 22 remains inactive for a long period of time. Moreover, since a micro OS has a smaller volume of coding than a large-scale OS, the micro OS 21 generally consumes a smaller amount of memory than the large-scale OS 22. Therefore, the CPU 11 can load the micro OS in a nonvolatile memory, such as an MRAM, that has a smaller capacity and lower power consumption. Aside from an MRAM, it is also possible to use a static random access memory (SRAM), in which the contents are stored using a battery, as a nonvolatile memory.

However, in contrast, the CPU 11 needs to load a general-purpose OS in a volatile memory, such as a DRAM, that has a greater capacity and higher power consumption. In that regard, in the information processing device 50 according to the second embodiment, the micro OS and the data related to the micro OS is stored in the nonvolatile main memory 51; the large-scale OS and the data related to the large-scale OS is stored in the volatile main memory 52; and the supply of electrical power to the volatile main memory 52 is disconnected during the period of time for which the large-scale OS 22 is inactive. As a result, it becomes possible to save electrical power in the information processing device 50.

Moreover, in the information processing device 50 according to the second embodiment, during the period of time for which the large-scale OS 22 is inactive, the supply of electrical power to the devices not used by the micro OS 21 (i.e., the peripheral devices 14 used by the large-scale OS 22 but not used by the micro OS 21) is disconnected. As a result, in the information processing device 50 according to the second embodiment, it becomes possible to save more electrical power.

Modification Example of Second Embodiment

Figure 14:
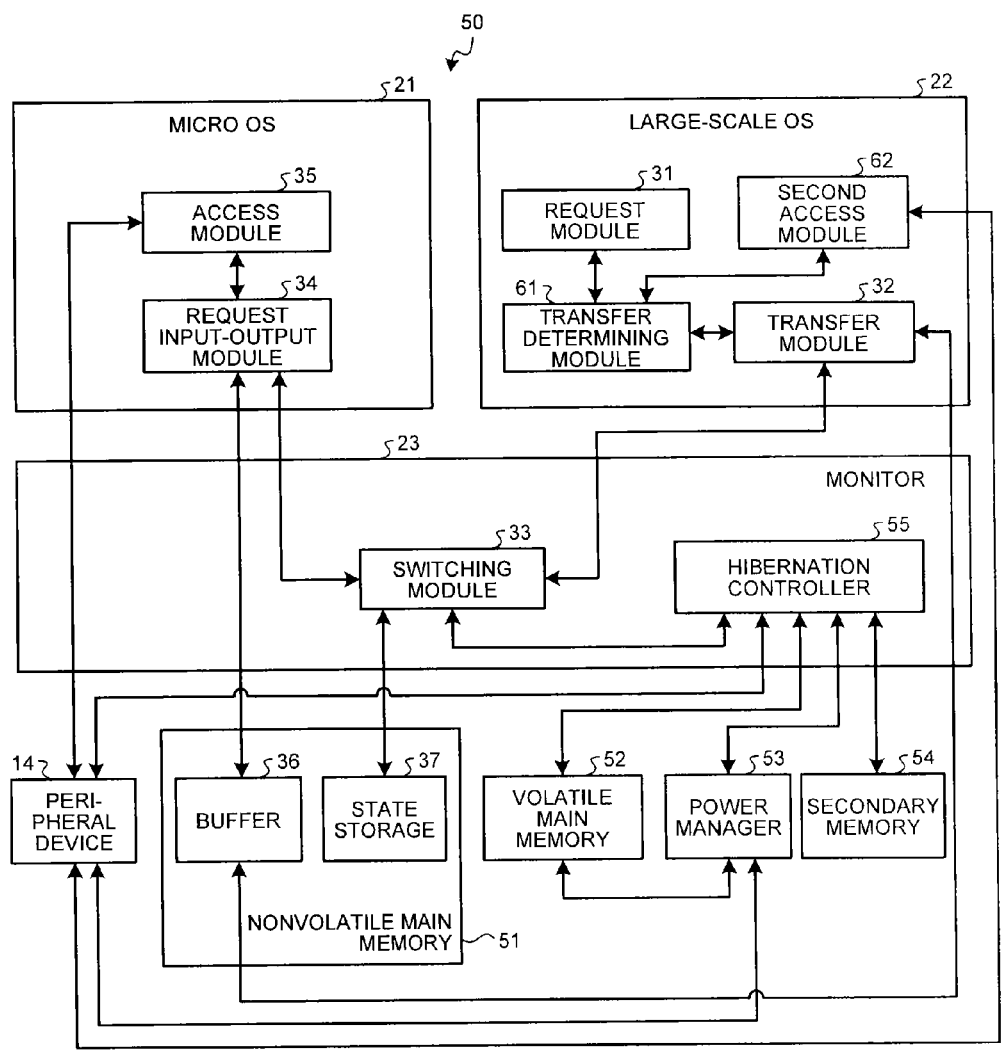
FIG. 14 is a diagram illustrating a functional configuration of the information processing device according to a modification example of the second embodiment.

FIG. 14 is a diagram illustrating a functional configuration of the information processing device 50 according to a modification example of the second embodiment. In the information processing device 50 according to the modification example, even when an access request is issued, the peripheral devices 14 can be directly accessed from the large-scale OS 22 in accordance with the conditions.

Herein, the information processing device 50 according to the modification example has a substantially identical functional configuration to the functional configuration illustrated in FIG. 11. Thus, the following explanation is given about the differences with the functional configuration illustrated in FIG. 11.

According to the modification example, the large-scale OS 22 includes a transfer determining module 61 and a second access module 62. In the modification example, while issuing an access request, the request module 31 calls the transfer determining module 61.

Thus, the transfer determining module 61 is called by the request module 31 when the request module 31 issues an access request. Then, the transfer determining module 61 determines whether or not to make the micro OS 21 access the peripheral devices 14.

For example, the transfer determining module 61 calculates, from the operating condition of the current task, a suspendable period that represents the period of time for which the large-scale OS 22 can suspend performing tasks. More particularly, for example, when the peripheral device 14 is instructed to perform operations according to an access request, the transfer determining module 61 calculates the operating period of the peripheral device 14 from the details of the access request and the operating capacity of the peripheral device 14. As an example, if the suspendable period of the large-scale OS 22 is equal to or greater than a predetermined first threshold value and if the operating period of the peripheral device 14 is equal to or greater than a predetermined second threshold value, then the transfer determining module 61 determines to make the micro OS 21 process the access request. However, as an example, if the suspendable period of the large-scale OS 22 is smaller than the first threshold value and if the operating period the peripheral devices 14 is smaller than the second threshold value, then the transfer determining module 61 determines to make the large-scale OS 22 process the access request.

When it is determined to make the micro OS 21 process the access request, the transfer determining module 61 calls the transfer module 32. On the other hand, when it is determined not to make the micro OS 21 process the access request (that is, when it is determined to make the large-scale OS 22 process the access request), the transfer determining module 61 does not call the transfer module 32 but calls the second access module 62.

Thus, when it is determined not to make the micro OS 21 access the peripheral device 14, the second access module 62 is called by the transfer determining module 61. Upon being called by the transfer determining module 61, the second access module 62 divides the access request into instructions in receivable units for the peripheral device 14, and accesses the peripheral device 14 according to each divided instruction. Then, the second access module 62 receives the accessing result from the peripheral device 14 and sends it to the transfer determining module 61.

Meanwhile, when it is determined to make the micro OS 21 access the peripheral device 14, the transfer module 32 is called by the transfer determining module 61. Upon being called by the transfer determining module 61, the transfer module 32 writes the access request with respect to the peripheral device 14 into the buffer 36. Moreover, upon being called by the switching module 33 due to the completion of accessing the peripheral devices 14, the transfer module 32 reads the accessing result from the buffer 36 and returns the accessing result to the transfer determining module 61. When the accessing result is received from the second access module 62 or from the transfer module 32, the transfer determining module 61 returns the accessing result to the request module 31.

Figure 15:
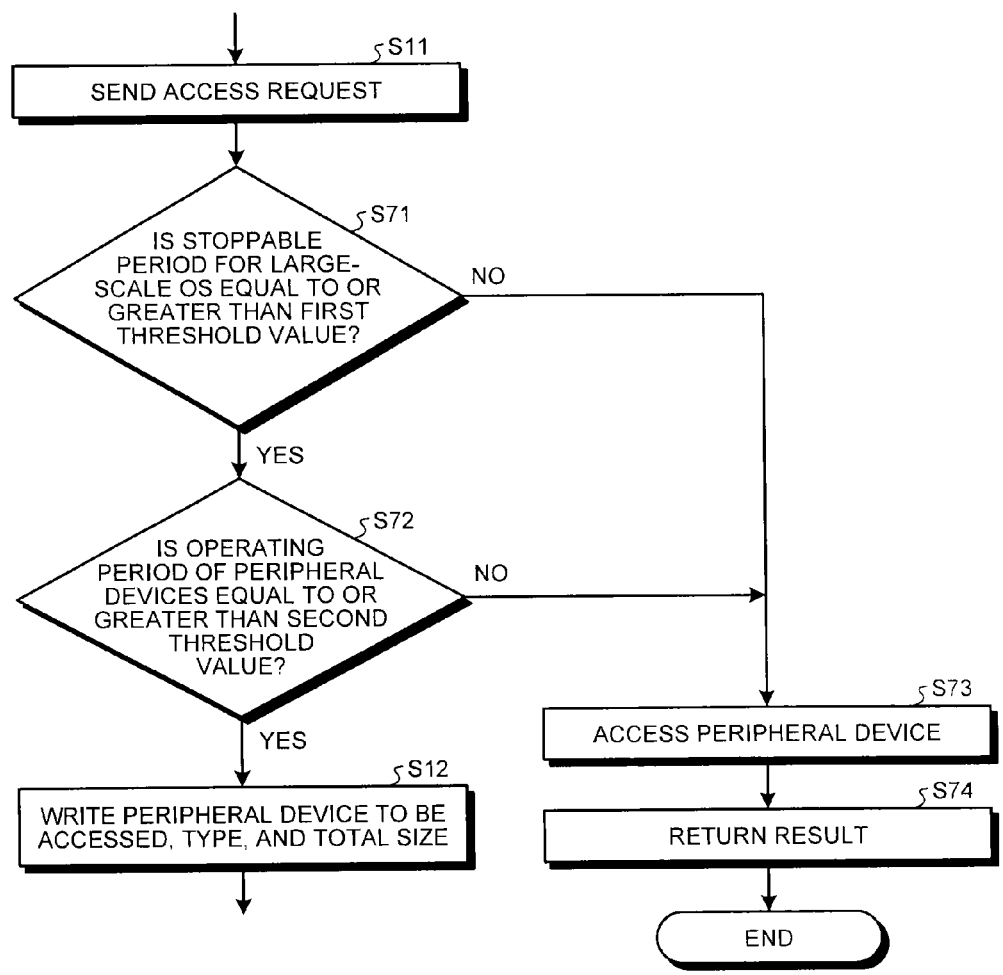
FIG. 15 is a diagram illustrating a flow of operations performed by a transfer determining module according to the modification example of the second embodiment.

FIG. 15 is a diagram illustrating a flow of operations performed by the transfer determining module 61 according to the modification example of the second embodiment. In the information processing device 50 according to the modification example, in addition to the flows of operations illustrated in FIGS. 6, 12, and 13; the operations from Steps S71 to S74 illustrated in FIG. 15 are performed in between Steps S11 and S12.

Firstly, at Step S11, the request module 31 calls the transfer determining module 61 and sends the access request to the transfer determining module 61. Then, the transfer determining module 61 calculates the suspendable period for the large-scale OS 22 from the operating condition of the current task, and determines whether or not the suspendable period for the large-scale OS 22 is equal to or greater than a predetermined first threshold value (Step S71). If the suspendable period for the large-scale OS 22 is equal to or greater than the first threshold value (Yes at Step S71), the system control proceeds to Step S72. However, if the suspendable period for the large-scale OS 22 is not equal to or greater than the first threshold value (No at Step S71), the system control proceeds to Step S73.

Subsequently, from the details of the access request and the operating capacity of the peripheral devices 14, the transfer determining module 61 calculates the operating period of the peripheral device 14; and determines whether or not the operating period of the peripheral device 14 is equal to or greater than a predetermined second threshold value (Step S72). If the operating period of the peripheral devices 14 is equal to or greater than the second threshold value (Yes at Step S72), the system control proceeds to Step S12. However, if the operating period of the peripheral devices 14 is not equal to or greater than a predetermined second threshold value (No at Step S72), then the system control proceeds to Step S73.

At Step S12, the transfer determining module 61 calls the transfer module 32. Then, the transfer module 32 writes, into the buffer 36, the value enabling identification of the peripheral device 14 to be accessed, the type, and the total size.

At Step S73, the transfer determining module 61 calls the second access module 62. Then, the second access module 62 divides the access request into instructions in receivable units for the peripheral devices 14, and accesses the peripheral device 14 according to each divided instruction. Then, the second access module 62 receives the accessing result from the peripheral device 14 and sends it to the transfer determining module 61 (Step S74). When the operation at Step S74 is completed, it marks the end of the flow of operations performed in the information processing device 50.

In the information processing device 50 according to the modification example, it becomes possible to save electrical power. Besides, in the case in which, due to the effect of the currently-running task, the suspendable period of the large-scale OS 22 is short and the operating period of the micro OS 21 exceeds the suspendable period thereby making it difficult to make the micro OS 21 process the access request; the large-scale OS 22 can be made to process the access request. Moreover, in the information processing device 50 according to the modification example, the peripheral device 14 has a short operating period. Hence, in case processing of the access request by the micro OS 21 would lead to an increase in the cost, the large-scale OS 22 can be made to process the access request.

Third Embodiment

Figures 16, 17:
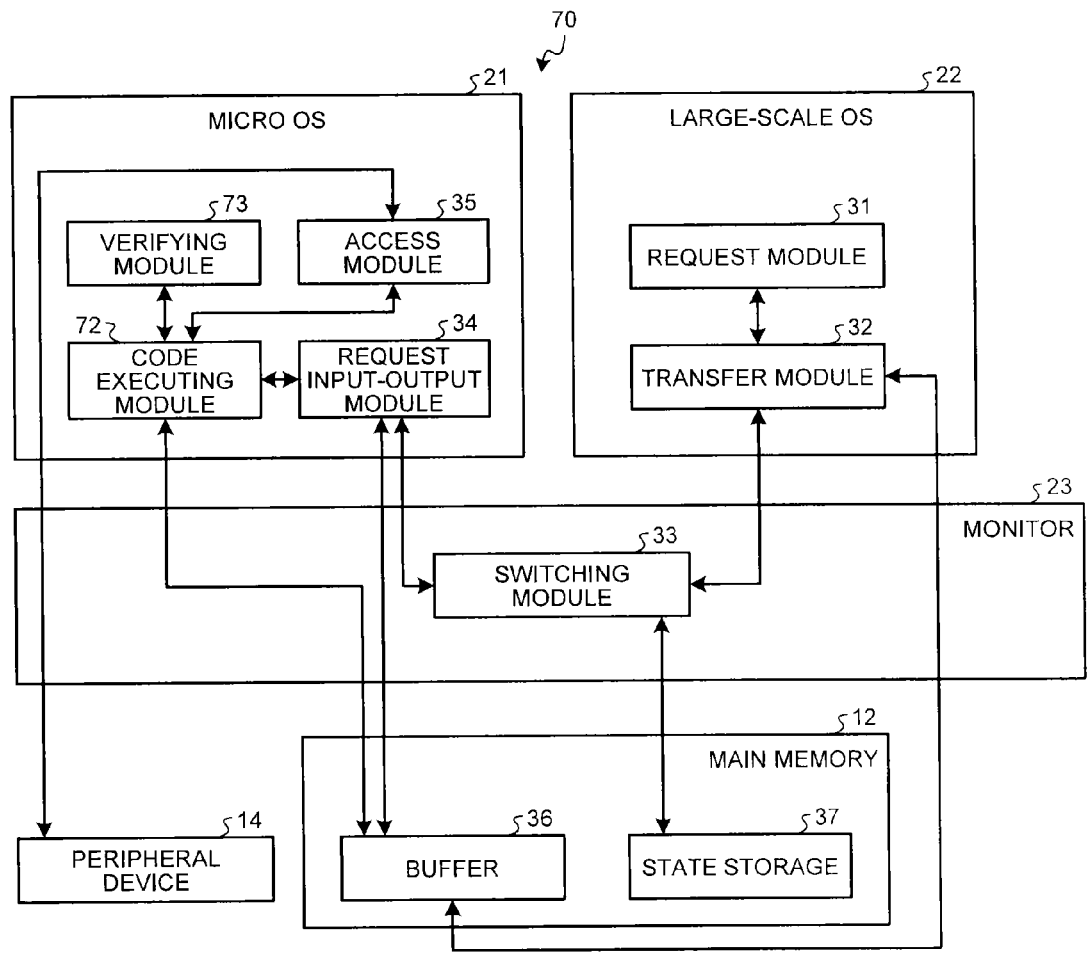
FIG. 16 is a diagram illustrating a functional configuration of an information processing device according to a third embodiment.
FIG. 17 is a diagram illustrating an example of information written in a buffer according to the third embodiment.

FIG. 16 is a diagram illustrating a functional configuration of an information processing device 70 according to a third embodiment. The information processing device 70 according to the third embodiment can make the micro OS 21 execute a sequence of instructions (a code), which includes access instructions with respect to the peripheral device 14.

Herein, the information processing device 10 according to the third embodiment has a substantially identical configuration to the configuration illustrated in FIG. 3. Thus, the following explanation is given about the differences with the configuration illustrated in FIG. 3.

According to the third embodiment, the request module 31 issues an access request that includes a sequence of instructions having access instructions with respect to the peripheral device 14; includes a signature; and includes input-output data. Meanwhile, if the access instructions included in a sequence of instructions are only of the input (read) type, it implies that the input-output data is empty. A signature represents information used in verifying whether or not a sequence of instructions is created in a correct manner.

The transfer module 32 writes, into the buffer 36, an access request that includes a sequence of instructions, a signature, and input-output data. As an example, into the buffer 36 is written information as illustrated in FIG. 17. The information illustrated in FIG. 17 represents an exemplary sequence of instructions for instructing a sound card, which functions as the peripheral device 14, to output data per second until there is no more data left in input-output data. Meanwhile, the sequence of instructions includes a value enabling identification of the peripheral device 14 to be accessed, the type of access, and the unique data of the peripheral device 14.

According to the third embodiment, the micro OS 21 further includes a code executing module 72 and a verifying module 73 in addition to the configuration explained with reference to FIG. 3.

In the third embodiment, upon being called by the switching module 33, the request input-output module 34 calls the code executing module 72. Upon being called by the request input-output module 34, the code executing module 72 reads the sequence of instructions, the signature, and input-output data from the buffer 36. Then, the code executing module 72 calls the verifying module 73 and sends the signature and the sequence of instructions to the verifying module 73.

Upon being called by the code executing module 72 and receiving the signature and the sequence of instructions, the verifying module 73 verifies the validness of the sequence of instructions. As an example, the verifying module 73 determines whether or not a hash value included in the signature and a hash value calculated from the sequence of instructions are identical and whether or not the signature is created using the correct key. If the hash values are identical and if the signature is created using the correct key, the verifying module 73 determines that the verification of the validness of the sequence of instructions is successful and returns the determination result to the code executing module 72. However, if the hash values are not identical or if the signature is not created using the correct key, the verifying module 73 returns information indicating an error to the code executing module 72. Meanwhile, as far as the method of verifying the signature is concerned, it is possible to implement a commonly known method such as the RSA signature method.

When the verifying module 73 succeeds in verifying the validness of the sequence of instructions, the code executing module 72 executes the sequence of instructions. In that case, when the sequence of instructions includes an access instruction, the code executing module 72 calls the access module 35 and sends the access instruction to the access module 35. Upon being called by the code executing module 72 and receiving the access instruction, the access module 35 accesses the specified peripheral device 14 and sends the accessing result to the code executing module 72. If the type of the access instruction is an input instruction (a read instruction), then the code executing module 72 writes the data included in the accessing result into the buffer 36.

When the execution of the sequence of instructions is completed, the code executing module 72 calls the request input-output module 34 due to the completion of accessing the peripheral device 14. Upon being called by the code executing module 72 due to the completion of accessing the peripheral device 14, the request input-output module 34 calls the switching module 33.

Meanwhile, an access request may not include the signature. In that case, the micro OS 21 does not include the verifying module 73, and the code executing module 72 executes the sequence of instructions without verifying the validness thereof.

Figure 18:
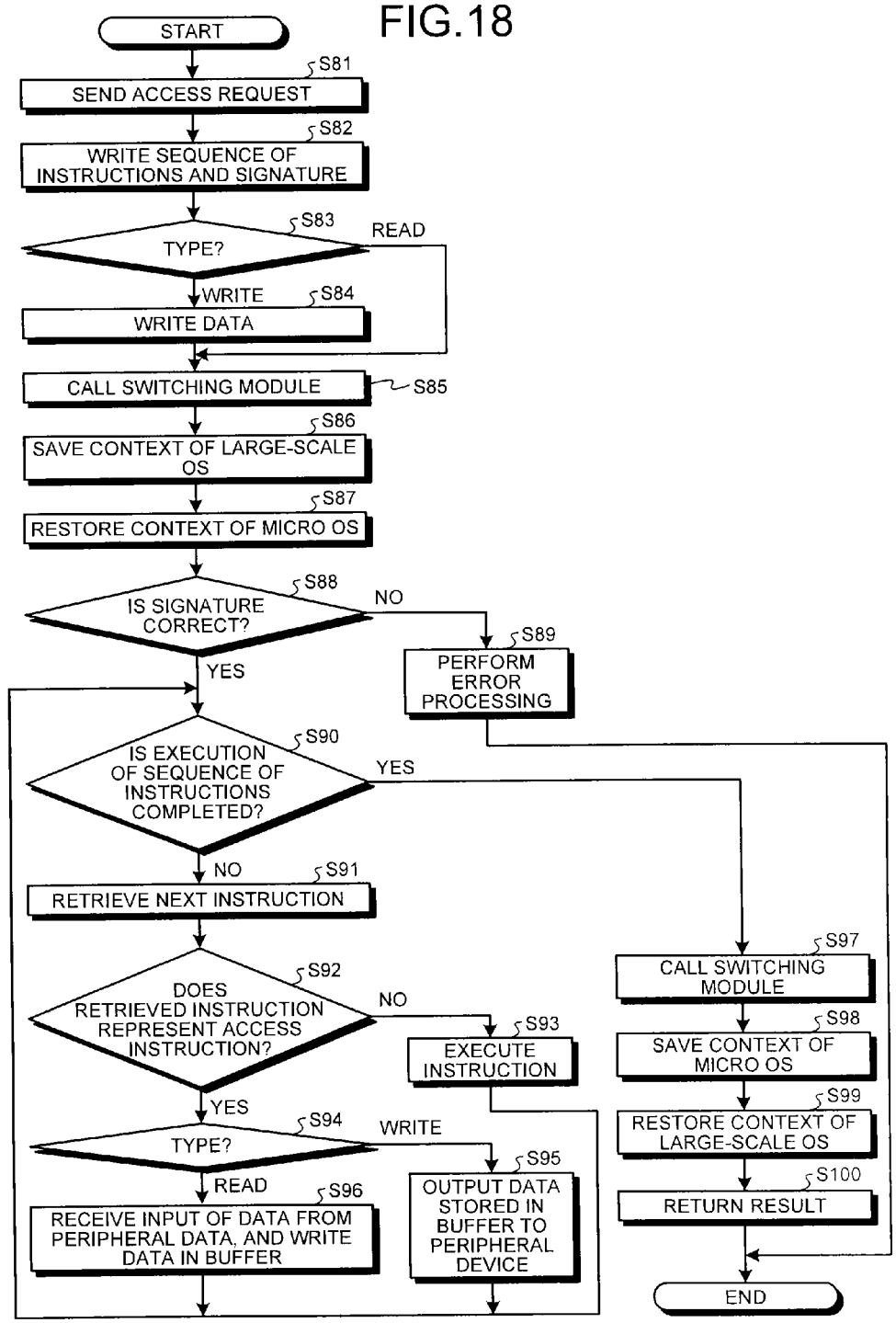
FIG. 18 is a diagram illustrating a flow of operations performed in the information processing device according to the third embodiment.

FIG. 18 is a diagram illustrating a flow of operations performed in the information processing device 70 according to the third embodiment.

Firstly, the request module 31 calls the transfer module 32, and sends an access request to the transfer module 32 (Step S81). Then, the transfer module 32 writes, into the buffer 36, the sequence of instructions and the signature included in the access request (Step S82). Subsequently, the transfer module 32 determines whether an access instruction included in the sequence of instructions is of the output (write) type or the input (read) type (Step S83). If the access instruction is of the output (write) type, then the transfer module 32 writes data into the buffer 36 (Step S84). Then, the system control proceeds to Step S85. On the other hand, if the access instruction is of the input (read) type, then the system control directly proceeds to Step S85. Then, the transfer module 32 calls the switching module 33 (Step S85).

Subsequently, the switching module 33 obtains the context of the large-scale OS 22, and writes the obtained context in the state storage 37. As a result, the switching module 33 can save the context of the large-scale OS 22, and suspend the execution of the large-scale OS 22 (Step S86).

Then, the switching module 33 reads the context of the micro OS 21 from the state storage 37, and restores the context. As a result, the switching module 33 can restart the execution of the micro OS 21 (Step S87). Then, the switching module 33 calls the request input-output module 34.

Subsequently, the request input-output module 34 calls the code executing module 72. Then, the code executing module 72 reads the sequence of instructions and the signature from the buffer 36, and calls the verifying module 73 for the verification of the signature (Step S88). If the signature is not correct (No at Step S88), then the code executing module 72 performs error processing (Step S89). That marks the end of the flow of operations. On the other hand, if the signature is correct (Yes at Step S88), the system control proceeds to Step S90.

At Step S90, the code executing module 72 determines whether or not the execution of the sequence of instructions is completed. If the execution of the sequence of instructions is completed (Yes at Step S90), the system control proceeds to Step S97. However, if the execution of the sequence of instructions is not completed (No at Step S90), the system control proceeds to Step S91.

At Step S91, the code executing module 72 retrieves the instruction to be executed next from the sequence of instructions. Then, the code executing module 72 determines whether or not the retrieved instruction is an access instruction with respect to the peripheral device 14 (Step S92). If the retrieved instruction is not an access request (No at Step S92), the system control proceeds to Step S93. Then, the code executing module 72 executes the retrieved instruction (Step S93).

However, if the retrieved instruction is an access instruction (Yes at Step S92), the system control proceeds to Step S94. Then, the code executing module 72 determines whether the retrieved instruction is of the output (write) type or the input (read) type (Step S94). If the retrieved instruction is of the output (write) type, then the code executing module 72 reads the data stored in the buffer 36, issues an output instruction (a write instruction) to the access module 35, and outputs the read data to the peripheral device 14 (Step S95). On the other hand, if the retrieved instruction is of the input (read) type, then the code executing module 72 issues an input instruction (a read instruction) to the access module 35, obtains data from Lho peripheral device 14, and writes the data into the buffer 36 (Step S96).

When the operation performed at Step S93, Step S95, or Step S96 is completed; the system control returns to Step S90. Then, the code executing module 72 performs the operations from Steps S90 to S96 in a repeated manner until the entire sequence of instructions is completely executed.

When the entire sequence of instructions is executed (Yes at Step S90), the code executing module 72 calls the switching module 33 (Step S97). Then, the switching module 33 obtains the context of the micro OS 21 and writes it in the state storage 37. As a result, the switching module 33 can save the context of the micro OS 21, and suspend the execution of the micro OS 21 (Step S98).

Subsequently, the switching module 33 reads the context of the large-scale OS 22 from the state storage 37 and restore the context. As a result, the switching module 33 can restart the execution of the large-scale OS 22 (Step S99). Then, the switching module 33 calls the transfer module 32.

Subsequently, the transfer module 32 returns the accessing result to the request module 31 (Step S100). If the access request is of the input (read) type, the transfer module 32 reads the input data from the buffer 36 and sends it to the request module 31. When the operation at Step S100 is completed, it marks the end of the flow of operations performed in the information processing device 70.

In this way, in the information processing device 70 according to the third embodiment, the micro OS 21 can be made to execute the sequence of instructions too. As a result, in the information processing device 70, accessing the peripheral devices 14 at complex timings or accessing complex areas in the peripheral devices 14 can be done with ease. Moreover, in the information processing device 70, since the signature of a sequence of instructions is verifiable, it becomes possible to prevent execution of an improper sequence of instructions. Furthermore, in the information processing device 70 according to the third embodiment, it is also possible to implement the configuration of the information processing device 50 according to the second embodiment. As a result, it becomes possible to save more electrical power.

Meanwhile, the computer programs executed in the information processing devices 10, 50, and 70 according to the embodiments described above are recorded as installable or executable files in a computer-readable recording medium provided as a computer program product such as a compact disk read only memory (CD-ROM), a flexible disk (FD), a compact disk readable (CD-R), or a digital versatile disk (DVD). Alternatively, the computer programs executed in the information processing devices 10, 50, and 70 according to the embodiments described above can be saved as downloadable files on a computer connected to a network such as the Internet or can be made available for distribution through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device connectable to a peripheral device, comprising:
    a buffer;
    a first operating system configured to control the information processing device;
    a second operating system configured to control the information processing device; and
    a monitor configured to execute either the first operating system or the second operating system to execute in a switching manner,
    the monitor includes a switching controller that, when the second operating system issues an access request with respect to the peripheral device, saves a state of the second operating system and suspends execution of the second operating system as well as restores a state of the firsL operating system and restarts execution of the first operating system, and
    the first operating system includes
        a request input-output controller that
            reads, from the buffer, the access request written by the second operating system with respect to the peripheral device,
            divides the read access request into instructions in receivable units for the peripheral device, and issues each of the divided instructions, and
        an access controller that accesses the peripheral device according to the instructions issued by the request input-output controller.

2. The information processing device according to claim 1, wherein
    the second operating system includes a transfer controller that writes the access request with respect to the peripheral device into the buffer.

3. The information processing device according to claim 2, wherein
    the first operating system being to be executed a first OS program by a processor,
    the second operating system being to be executed a second OS program by the processor, and
    the first OS program has a smaller line of code than the second OS program.

4. The information processing device according to claim 2, wherein
    the access controller receives an accessing result from the peripheral device,
    the request input-output controller writes the accessing result received by the access controller into the buffer,
    the switching controller saves a state of the first operating system and suspends execution of the first operating system as well as restores a state of the second operating system and restarts execution of the second operating system when accessing of the peripheral device is completed, and
    the transfer controller reads the accessing result from the buffer when accessing of the peripheral device is completed.

5. The information processing device according to claim 4, wherein
    the first operating system further includes a switching determining controller that determines whether or not to stop the execution of the first operating system and to restart the execution of the second operating system while operations of the peripheral device are underway,
    the switching controller saves the state of the first operating system and suspends the execution of the first operating system as well as restores the state of the second operating system and restarts the execution of the second operating system when the switching determining controller determines to suspend the execution of the first operating system and to restart the execution of the second operating system, and
    the switching controller saves the state of the second operating system and suspends the execution of the second operating system as well as restores the state of the first operating system and restarts the execution of the first operating system when the peripheral device completes operations started in response to an access from the first operating system.

6. The information processing device according to claim 5, wherein the switching determining controller determines to suspend the execution of the first operating system and to restart the execution of the second operating system when an estimated operating period of the peripheral device is equal to or greater than a predetermined period of time.

7. The information processing device according to claim further comprising:
    a secondary memory; and
    a volatile main memory configured to store a program and data for causing the second operating system to execute by the processor, wherein
    the monitor further includes a hibernation controller,
    the hibernation controller writes a copy of the program and the data stored in the volatile main memory into the secondary memory and disconnects supply of electrical power to the volatile main memory to suspend the execution of the second operating system, and
    the hibernation controller activates supply of electrical power to the volatile main memory, reads a copy of the program and the data from the secondary memory, and writes the copy into the volatile main memory to restart the execution of the second operating system.

8. The information processing device according to claim 7, further comprising a nonvolatile main memory configured to store a program and data for causing the first operating system to execute by the processor, wherein
    the nonvolatile main memory includes the buffer.

9. The information processing device according to claim 7, wherein
    the hibernation controller writes a state of the peripheral device that is used by the second operating system but is not used by the first operating system into the secondary memory and disconnects supply of electrical power to the peripheral device to suspend the execution of the second operating system, and the hibernation controller activates supply of electrical power to the peripheral device that is used by the second operating system but is not used by the first operating system, and sets the peripheral device to a state stored in the secondary memory to restart the execution of the second operating system.

10. The information processing device according to claim 7, wherein the second operating system includes
  a transfer determining controller that determines whether or not to cause the first operating system to access the peripheral device, and
  a second access controller that divides the access request into instructions in receivable units for the peripheral device and accesses the peripheral device according to each of the divided instructions when the transfer determining controller determines not to cause the first operating system to access the peripheral device,
the transfer controller writes the access request with respect to the peripheral device into the buffer when the transfer determining controller determines to cause the first operating system to access the peripheral device, and
the switching controller saves the state of the second operating system and suspends the execution of the second operating system as well as restores the state of the first operating system and restarts the execution of the first operating system when the switching determining controller determines to cause the first operating system to access the peripheral device.

11. The information processing device according to claim 10, wherein the transfer determining controller determines to cause the first operating system to execute the access request when a suspendable period for the second operating system is equal to or greater than a first threshold value and when an operating period of the peripheral device is equal to or greater than a second threshold value.

12. The information processing device according to claim 2, wherein the transfer controller writes an access request including a sequence of instructions for accessing the peripheral device into the buffer,
the first operating system includes a code executing controller that reads the sequence of instructions from the buffer and executes the sequence of instructions, and
the request input-output controller issues an access instruction with respect to the peripheral device according to execution of the sequence of instructions executed by the code executing controller.

13. The information processing device according to claim 12, wherein the first operating system further includes a verifying controller that verifies validness of the sequence of instructions, and the code executing controller executes the sequence of instructions when the verifying controller succeeds in verifying validness of the sequence of instructions.

14. An information processing method implemented in an information processing device connectable to a peripheral device, the information processing device including a buffer, a first operating system configured to control the information processing device, a second operating system configured to control the information processing device, and a monitor configured to enable either the first operating system or the second operating system to execute in a switching manner, the method comprising:

by the monitor, saving a state of the second operating system and suspending execution of the second operating system as well as restoring a state of the first operating system and restarting execution of the first operating system when the second operating system issues an access request with respect to the peripheral device;

reading, by the first operating system, the access request written by the second operating system with respect to the peripheral device from the buffer;

dividing, by the first operating system, the read access request into instructions in receivable units for the peripheral device;

issuing, by the first operating system, each of the divided instructions; and accessing, by the first operating system, the peripheral device according to the issued instructions.

15. A computer program product comprising a computer-readable medium containing a program executed by a computer included in an information processing device connectable to a peripheral device, the information processing device including a buffer, a first operating system configured to control the information processing device, a second operating system configured to control the information processing device, and a monitor configured to enable either the first operating system or the second operating system to execute in a switching manner, the program causing the computer to execute:

in the monitor, saving a state of the second operating system and suspending execution of the second operating system as well as restoring a state of the first operating system and restarting execution of the first operating system when the second operating system issues an access request with respect to the peripheral device;

reading, in the first operating system, the access request written by the second operating system with respect to the peripheral device from the buffer;

dividing, in the first operating system, the read access request into instructions in receivable units for the peripheral device;

issuing, in the first operating system, each of the divided instructions; and accessing, in the first operating system, the peripheral device according to the issued instructions.

* * * * *